US012684339B2

(12) United States Patent
Phan et al.

(10) Patent No.: US 12,684,339 B2
(45) Date of Patent: Jul. 14, 2026

(54) NETWORK NODE, USER EQUIPMENT, AND METHODS FOR HANDLING COMMUNICATIONS USING MULTIPLE SIM MODULES

(71) Applicant: Telefonaktiebolaget LM Ericsson (publ), Stockholm (SE)

(72) Inventors: Mai-Anh Phan, Herzogenrath (DE); Hernán Felipe Arraño Scharager, Täby (SE); Paul Schliwa-Bertling, Ljungsbro (SE); Lian Araujo, Solna (SE); Magnus Stattin, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 334 days.

(21) Appl. No.: 18/698,391

(22) PCT Filed: Oct. 5, 2022

(86) PCT No.: PCT/SE2022/050890
§ 371 (c)(1),
(2) Date: Apr. 4, 2024

(87) PCT Pub. No.: WO2023/059250
PCT Pub. Date: Apr. 13, 2023

(65) Prior Publication Data
US 2024/0406715 A1 Dec. 5, 2024

Related U.S. Application Data

(60) Provisional application No. 63/262,150, filed on Oct. 6, 2021.

(51) Int. Cl.
*H04W 8/24* (2009.01)
*H04W 8/20* (2009.01)
(Continued)

(52) U.S. Cl.
CPC ............. *H04W 8/24* (2013.01); *H04W 8/205* (2013.01); *H04W 60/005* (2013.01); *H04W 84/042* (2013.01); *H04W 88/06* (2013.01)

(58) Field of Classification Search
CPC ... H04W 60/005; H04W 72/51; H04W 8/205; H04W 8/24; H04W 84/042; H04W 88/00
See application file for complete search history.

(56) References Cited

U.S. PATENT DOCUMENTS

| | | | |
|---|---|---|---|
| 2015/0230286 A1* | 8/2015 | Feuersaenger .... | H04W 72/1215 370/252 |
| 2021/0120524 A1 | 4/2021 | Palle et al. | |

(Continued)

FOREIGN PATENT DOCUMENTS

| | | |
|---|---|---|
| WO | 2019095254 A1 | 5/2019 |
| WO | 2021069085 A1 | 4/2021 |

(Continued)

OTHER PUBLICATIONS

3GPP, "3rd Generation Partnership Project; Technical Specification Group Radio Access Network; NR; Radio Resource Control (RRC) protocol specification (Release 16)", 3GPP TS 38.331 V16.5.0, Jun. 2021, 1-959.

(Continued)

*Primary Examiner* — Awet Haile
(74) *Attorney, Agent, or Firm* — Murphy, Bilak & Homiller, PLLC

(57) ABSTRACT

Embodiments herein relate to method performed by a UE (102) having multiple SIMs for simultaneous communication with two or more wireless communications networks. The UE (102) provides, to a first network node (104) associated with a first wireless communications network associated with a first SIM, information on full capability of the UE (102), wherein the UE (102) is registered with the first wireless communications network. The UE further (Continued)

provides, to a second network node (106) associated with a second wireless communications network associated with a second SIM, the information on the full capability of the UE (102), wherein the CE (102) is registered with the second wireless communications network such that the UE (102) is simultaneously registered with the first wireless communications network and the second wireless communications network. The UE further splits the full capability among the first and second SIMs into a first reduced capability and a second reduced capability, and provides a first indication of the first reduced capability to the first network node; and/or a second indication of the second reduced capability to the second network node.

26 Claims, 11 Drawing Sheets

(51) Int. Cl.
H04W 60/00 (2009.01)
*H04W 84/04* (2009.01)
*H04W 88/06* (2009.01)

(56) References Cited

U.S. PATENT DOCUMENTS

| | | | | |
|---|---|---|---|---|
| 2022/0270067 | A1* | 8/2022 | Lu | G06Q 40/02 |
| 2023/0105675 | A1* | 4/2023 | Hedayat | H04W 72/51 |
| | | | | 370/329 |
| 2023/0247701 | A1* | 8/2023 | Ozturk | H04W 76/15 |
| | | | | 370/329 |
| 2023/0422021 | A1* | 12/2023 | Sha | H04W 8/24 |
| 2024/0314542 | A1* | 9/2024 | Kim | H04W 8/24 |

FOREIGN PATENT DOCUMENTS

| | | |
|---|---|---|
| WO | 2021090179 A1 | 5/2021 |
| WO | 2021113581 A1 | 6/2021 |

OTHER PUBLICATIONS

Moderator (China Telecom) "Email discussion summary for [RAN-R18-WS-eMBB-China_Telecom]", 3GPP TSG RAN Rel-18 workshop, RWS-210517, E-Meeting, Jun. 28-Jul. 2, 2021, 1-71.

3GPP, "3GPP TR 36.816 V11.2.0 (Dec. 2011)", 3rd Generation Partnership Project; Technical Specification Group Radio Access Network; Evolved Universal Terrestrial Radio Access (E-UTRA); Study on signalling and procedure for interference avoidance for in-device coexistence (Release 11), Dec. 2011, pp. 1-44.

VIVO (Moderator), "Report of phase 1 Multi-SIM email discussion", 3GPP TSG-RAN WG Meeting #85, RP-191898, Newport Beach, USA, Sep. 16-20, 2019, 1-36.

* cited by examiner

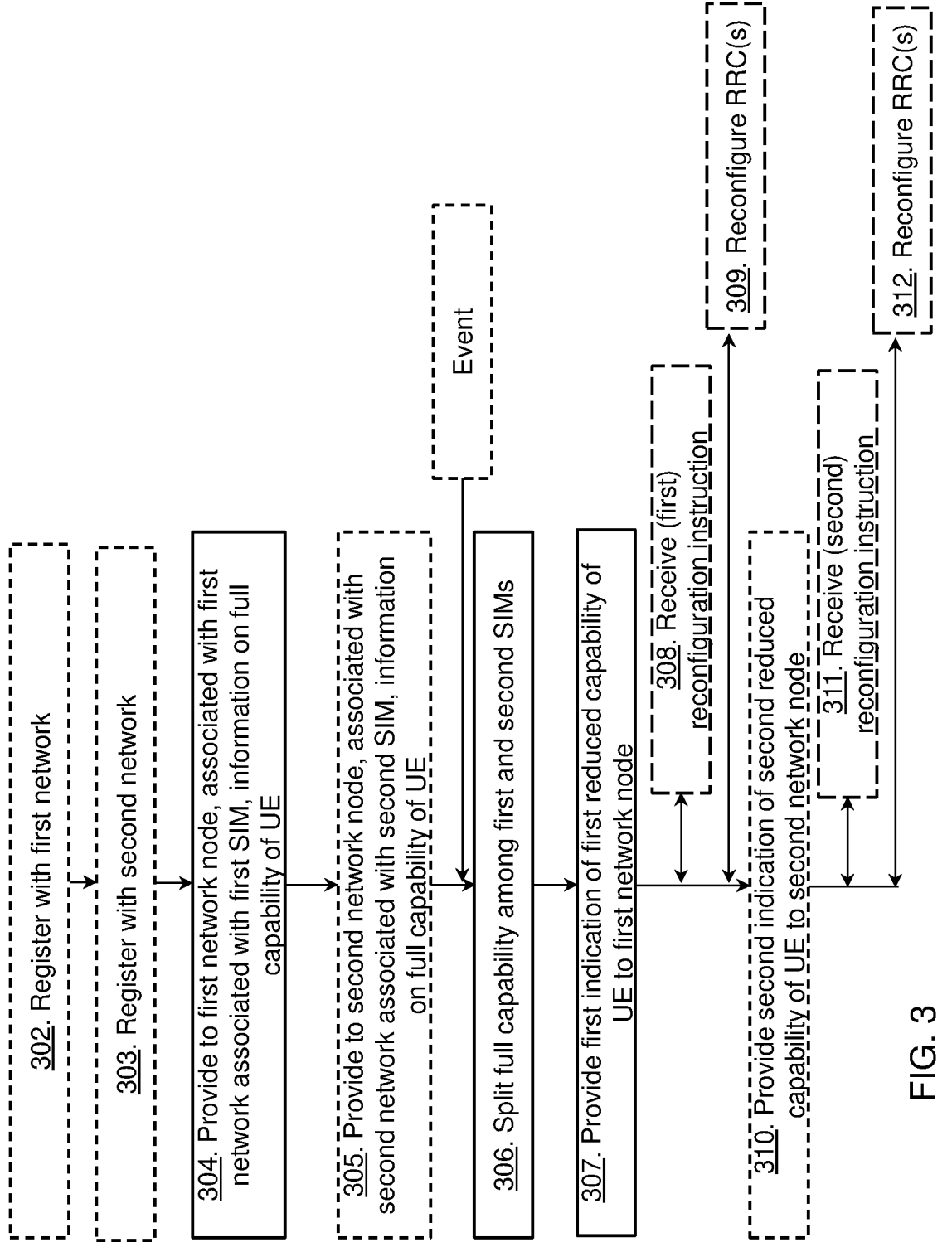

302. Register with first network

303. Register with second network

304. Provide to first network node, associated with first network associated with first SIM, information on full capability of UE 305. Provide to second network node, associated with second network associated with second SIM, information on full capability of UE Event 306. Split full capability among first and second SIMs 307. Provide first indication of first reduced capability of UE to first network node 308. Receive (first) reconfiguration instruction 309. Reconfigure RRC(s)

310. Provide second indication of second reduced capability of UE to second network node 311. Receive (second) reconfiguration instruction 312. Reconfigure RRC(s)

FIG. 3

401. Receive information on full capability of UE

402. Receive first indication of first reduced capability of UE

403. Provide reconfiguration instruction to UE

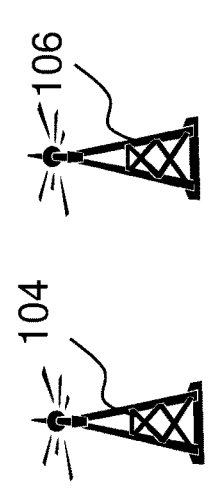
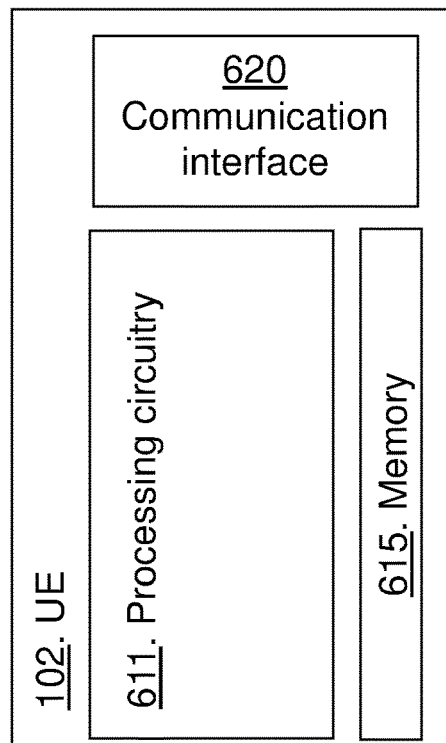
102. UE
620
Communication
interface
611. Processing circuitry
615. Memory
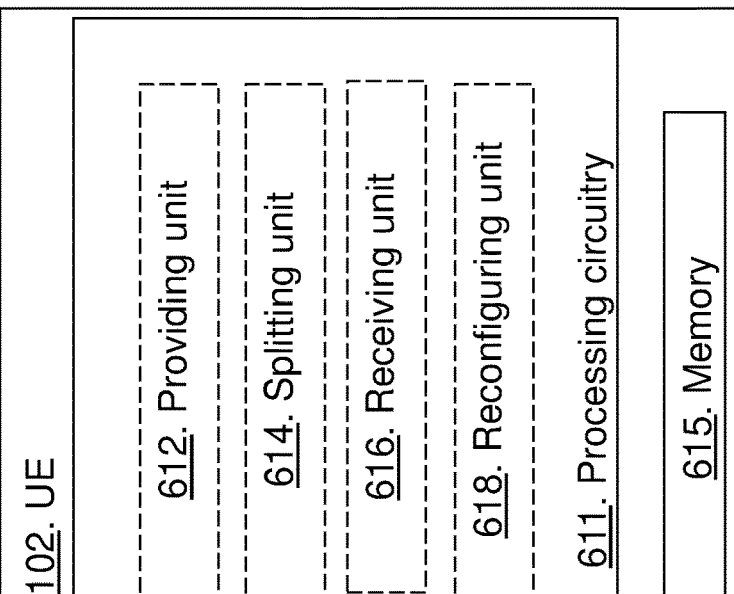
102. UE
612. Providing unit
614. Splitting unit
616. Receiving unit
618. Reconfiguring unit
611. Processing circuitry
615. Memory
627
626
FIG. 6

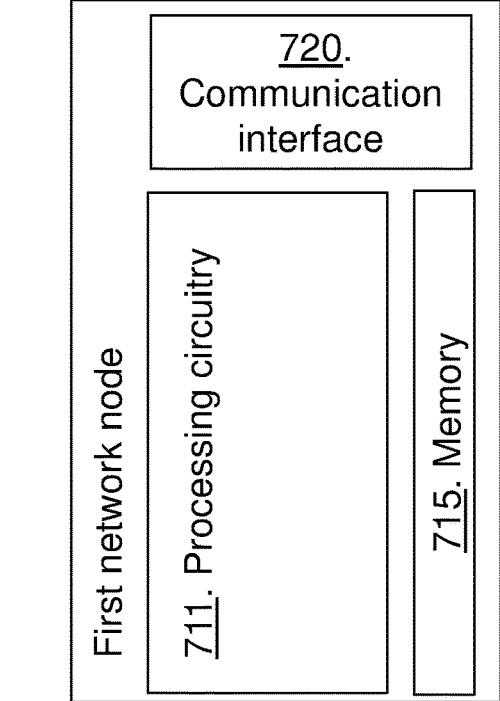
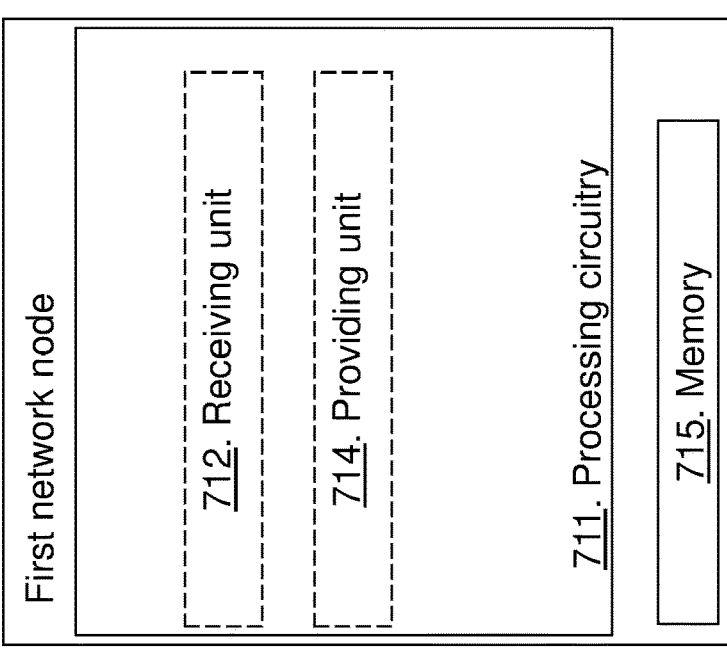
720.
Communication
interface
First network node
711. Processing circuitry
715. Memory
102
First network node
712. Receiving unit
714. Providing unit
711. Processing circuitry
715. Memory
727
726
FIG. 7

NETWORK NODE, USER EQUIPMENT, AND METHODS FOR HANDLING COMMUNICATIONS USING MULTIPLE SIM MODULES

TECHNICAL FIELD

Embodiments herein relate to a user equipment (UE), a first network node, and methods performed therein regarding wireless communication. Furthermore, a computer program product and a computer-readable storage medium are also provided herein. In particular, embodiments herein relate to handling communication, such as handling operation of a multi-Subscriber Identity Module (SIM) user equipment.

BACKGROUND

In a typical wireless communications network, UEs, also known as wireless communication devices, mobile stations, stations (STA) and/or wireless devices, communicate via a Radio Access Network (RAN) with one or more core networks (CN). The RAN covers a geographical area which is divided into service areas or cell areas, with each service area or cell area being served by radio network node such as an access node, e.g., a Wi-Fi access point or a radio base station (RBS), which in some networks may also be called, for example, a NodeB, a gNodeB, or an eNodeB. The service area or cell area is a geographical area where radio coverage is provided by the radio network node. The radio network node operates on radio frequencies to communicate over an air interface with the UEs within range of the radio network node. The radio network node communicates over a downlink (DL) to the UE, and the UE communicates over an uplink (UL) to the radio network node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipment. In a forum known as the Third Generation Partnership Project (3GPP), telecommunications suppliers propose and agree upon standards for present and future generation networks and UTRAN specifically, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the 3GPP and this work continues in the coming 3GPP releases, such as 6G networks and development of 5G such as New Radio (NR). The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

With the emerging 5G technologies, such as new radio (NR), the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

Next generation systems are expected to support a wide range of use cases with varying requirements ranging from fully mobile devices to stationary internet of things (IoT) or fixed wireless broadband devices. The traffic pattern associated with many use cases may be expected to consist of short or long bursts of data traffic with varying length of waiting period in between, here called inactive state. In NR, both license assisted access and standalone unlicensed operation are to be supported. Hence the procedure of Physical Random Access Channel (PRACH) transmission and/or Scheduling Request (SR) transmission in unlicensed spectrum may be investigated in 3GPP.

Multiple Subscriber Identity Module (SIM), or "Multi-SIM," devices are devices which enable use of multiple subscriptions in one device using more than one Universal Mobile Telecommunications System (UMTS) Subscriber Identity Module (USIM). Multi-SIM UE's can support concurrent registration to more than one network simultaneously and, e.g., if a UE has two different radios implemented, such as both dual receive (Rx) and dual transmit (Tx) capability, it would be possible for the UE to behave as two separate UEs and communicate with two networks at the same time. There are also dual or multi-SIM capable UEs that only have one single radio front-end and baseband processing.

The ability of a UE to support multiple USIMs (MUSIMs) has become a mainstream feature. For example, a user may have a work SIM, a private SIM, and other SIMs for other purposes, which may be used in one or more UEs. As another example, mobile devices such as, a smartphone, a smartwatch and other wearables, need to have multi-SIM capability to be able to connect to the same mobile number. Multi-SIM capability for voice calls means that a user may be reached at the same mobile number via these devices without connecting via the smartphone.

MUSIM devices, e.g., UEs with more than one receiver (Rx) and/or transmitter (Tx), may simultaneously connect to more than one network such as a Public Land Mobile Network (PLMN). Factors such as, e.g., different possible network configurations and a changing demand for diverse types of operations, e.g., multi-carrier, can affect the complexity of such frameworks. For example, for UEs with dual Rx and dual Tx radios, certain services on one network may require both radios to satisfy quality of service (QOS) requirements, leaving no resources for another network.

Despite the growing interest in multi-SIM devices, it generally remains challenging to manage simultaneous communication of a wireless device, such as a UE, with more than one network. For example, decisions may need to be made regarding what communication(s) to prioritize. In some cases, a network may, e.g., continue scheduling data to a UE that is no longer able to receive data, which in turn deteriorates network performance. Also, certain services may require, e.g., both radios of a dual radio UE, leaving no resources for communications with another network.

SUMMARY

An object herein is to provide improved handling of operation of a multi-SIM UE. More specifically, embodiments of the present disclosure provide a way for a UE to signal its capability to network(s), in a manner that does not require any specification changes. Thus, the UE signals or provides its full capability to one or more networks to which the UE is registered. To indicate changes in the UE capability, which may require resource reduction, e.g., release of one or more carrier frequencies, an indication is provided to one or more networks with which the UE communicates, and which were previously informed of the full UE capability. The indication may be in the form of, e.g., a so-called MUSIM-related assistance information. With the MUSIM assistance information, a network gets a better understanding of the UE status, e.g., the network understands that the required resource reduction provided by the UE is caused by multiple SIM usage/connectivity and can thus adapt/optimize the radio resource configuration for the UE. In some embodiments, the UE assistance information can be provided using an existing In-Device Coexistence (IDC) Assistance Information, which can be reused, along with an additional indication on multiple SIM usage/connectivity. For example, the additional indication in accordance with embodiments of the present disclosure may be provided, from the UE to the network, that a (previous) IDC Assistance Information message is signalled because the UE is connected to multiple networks and has simultaneous communication issues.

According to an aspect of the present disclosure, the object is achieved by providing a method performed by a UE having multiple SIMs, for simultaneous communication with two or more wireless communications networks. The method comprises:

providing, to a first network node associated with a first wireless communications network associated with a first SIM, information on full capability of the UE, wherein the UE is registered with the first wireless communications network;

providing, to a second network node associated with a second wireless communications network associated with a second SIM, the information on the full capability of the UE, wherein the UE is registered with the second wireless communications network such that the UE is simultaneously registered with both the first wireless communications network and the second wireless communications network;

splitting the full capability among the first and second SIMs into a first reduced capability and a second reduced capability;

providing a first indication of the first reduced capability to the first network node; and/or providing a second indication of the second reduced capability to the second network node.

According to another aspect of the present disclosure, the object is achieved by providing a method performed by a first network node associated with a wireless communications network. The method comprises:

receiving, from a UE, information on a full capability of the UE (102), wherein the UE has at least two SIMs and is simultaneously registered with the wireless communications network and at least one another wireless communications network;

receiving, from the UE, a first indication of a first reduced capability of the UE indicating a split of the full capability of the UE among the at least two SIMs; and providing, to the UE, a reconfiguration instruction, in response to the received first indication of the first reduced capability of the UE.

It is furthermore provided herein a computer program product comprising instructions, which, when executed on at least one processor, cause the at least one processor to carry out any of the methods herein, as performed by the UE and the first network node, respectively. It is additionally provided herein a computer-readable storage medium, having stored thereon a computer program product comprising instructions which, when executed on at least one processor, cause the at least one processor to carry out any of the methods herein, as performed by the UE and the first network node, respectively.

The object is further achieved by providing a UE and a first network node configured to perform the methods herein, respectively.

Thus, it is herein provided a UE having multiple SIMs for simultaneous communication with two or more wireless communications networks. The UE is configured to provide, to a first network node associated with a first wireless communications network associated with a first SIM, information on full capability of the UE, wherein the UE is registered with the first wireless communications network. The UE is further configured to provide, to a second network node associated with a second wireless communications network associated with a second SIM, the information on the full capability of the UE, wherein the UE is registered with the second wireless communications network such that the UE is simultaneously registered with the first wireless communications network and the second wireless communications network. The UE is further configured to split the full capability among the first and second SIMs into a first reduced capability and a second reduced capability; and then to provide a first indication of the first reduced capability to the first network node; and/or providing (310) a second indication of the second reduced capability to the second network node.

It is furthermore provided herein a first network node associated with a first wireless communications network. The first network node is configured to receive from a UE, information on a full capability of the UE, wherein the UE has at least two SIMs, and is simultaneously registered with the first wireless communications network and at least a second wireless communications network. The first network node is further configured to receive, from the UE, a first indication of a first reduced capability of the UE indicating a split of the full capability of the UE among the at least two SIMs; and to provide, to the UE, a reconfiguration instruction, in response to the received first indication of the first reduced capability of the UE.

Embodiments herein allow allocation of resources for communication between UE and multiple wireless communications networks in a more efficient, dynamic manner. Before a reduced capability is to be reported with a respective indication, the UE reports its full capability to respective network node, such that no changes to Radio Resource Control (RRC) protocol specification are needed. Also, granularity is improved for cases in which the UE needs to free up specific radio frequency (RF) chains for multi-SIM purposes. Thus, embodiments herein enable communication of multi-SIM UEs in an efficient manner in a wireless communications network, and thereby improve the overall performance of the wireless communications network and/or improve user experience.

BRIEF DESCRIPTION OF THE DRAWINGS

Embodiments will now be described in more detail in relation to the enclosed drawings, in which:

FIG. 3 is a schematic flowchart illustrating a method performed by a UE, in accordance with some embodiments;

FIG. 6 is a block diagram depicting a UE in accordance with some embodiments;

FIG. 7 is a block diagram depicting a first network node in accordance with some embodiments;

DETAILED DESCRIPTION

Figure 1:
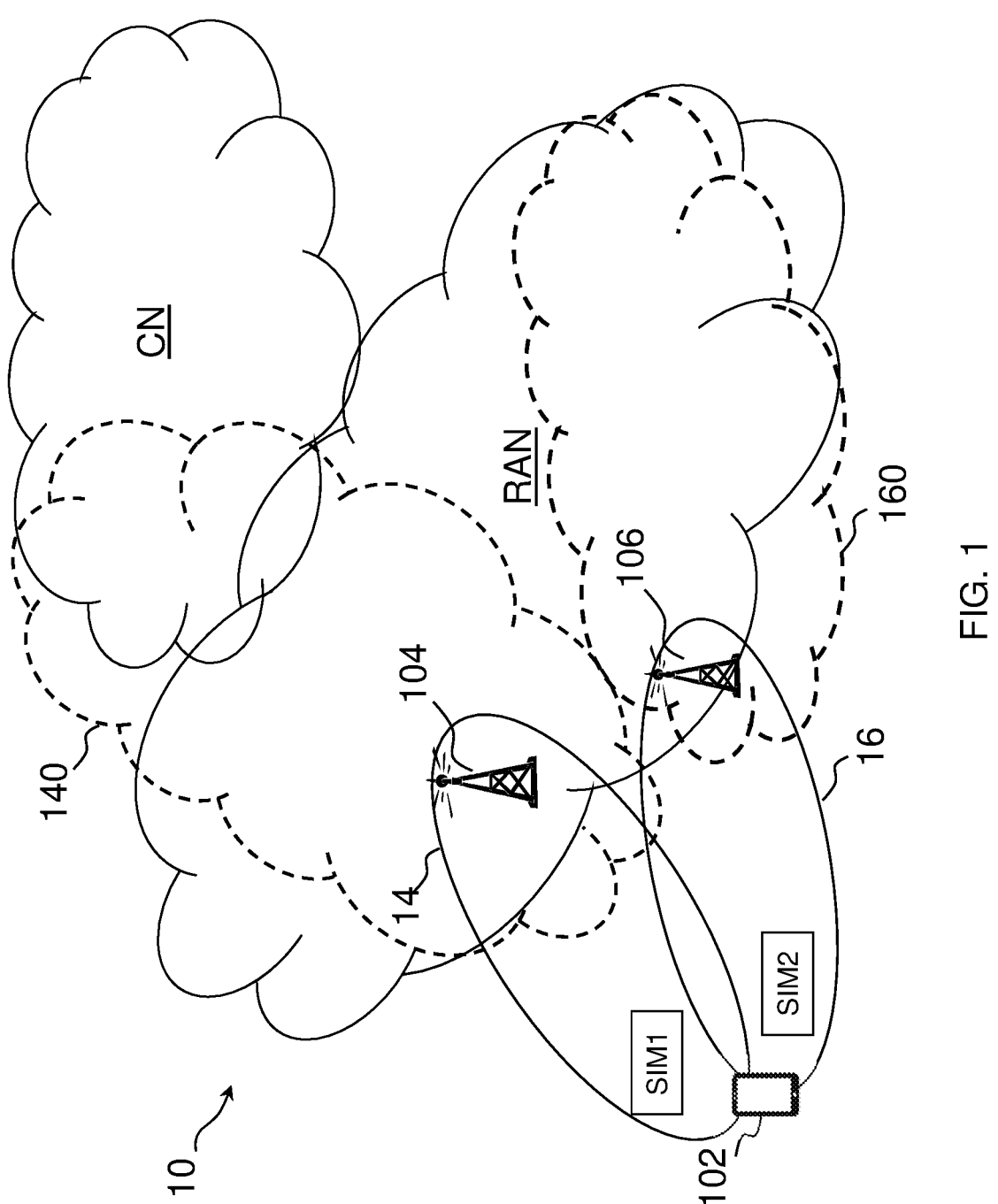
FIG. 1 is a schematic overview depicting a wireless communications network in accordance with some embodiments of the present disclosure.

Embodiments herein relate to wireless communications networks in general. FIG. 1 is a schematic overview depicting a wireless communications network 10. The wireless communications network 10 comprises one or more RANs and one or more CNs. The wireless communications network 10 may use one or a number of different technologies. Embodiments herein relate to recent technology trends that are of particular interest in a New Radio (NR) context, however, embodiments are also applicable in further developments of existing wireless communications systems such as e.g. LTE or Wideband Code Division Multiple Access (WCDMA).

In the wireless communications network 10, a user equipment (UE) 102, such as a mobile station, a wireless device, a non-access point (non-AP) STA, a STA, and/or a wireless terminal, is communicating via e.g. one or more Access Networks (AN), e.g. RAN, to one or more core networks (CN). It should be understood by the skilled in the art that "UE" is a non-limiting term which means any terminal, wireless communications terminal or device, user equipment, NB-IoT device, Machine Type Communication (MTC) device, Device to Device (D2D) terminal, or node, e.g. smart phone, laptop, mobile phone, sensor, relay, mobile tablets or even a small base station capable of communicating using radio communication with a radio network node within an area served by the radio network node.

The wireless communications network 10 comprises one or more first network nodes.

The wireless communications network 10 comprises a first network node 104, e.g., an access node, an access controller, a base station, e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), MME, AMF, a stand-alone access point, or any other network unit or node capable of communicating with a wireless device within a service area 14 served by the radio network node depending e.g., on a radio access technology and terminology used. The service area 14 may also be referred to as a beam or a beam group of a first radio access technology (RAT), such as 5G, LTE, Wi-Fi, or similar. The first network node 104 may be associated with and provide radio communication in a first wireless communications network 140, such as, e.g., a first Public Land Mobile Network (PLMN) or a first Non-Public Network (NPN). In some embodiments, the first wireless communications network 140 may be implemented as a combination of a PLMN and an NPN.

The wireless communications network 10 comprises a second network node 106, e.g., an access node, an access controller, a base station, e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), MME, AMF, a stand-alone access point, or any other network unit or node capable of communicating with a wireless device within a service area 16 served by the radio network node depending e.g., on a radio access technology and terminology used. The service area 16 may also be referred to as a beam or a beam group of a first radio access technology (RAT), such as 5G, LTE, Wi-Fi, or similar. The second network node 106 may be associated with and provide radio communication in a second wireless communications network 160, such as, e.g., a second PLMN or a second NPN. In some embodiments, the second wireless communications network 160 may be implemented as a combination of a PLMN and an NPN.

Embodiments of the present disclosure relate to multi-SIM, or MUSIM, devices that can enable users to be registered to multiple networks, such as PLMNs, NPNs, or a combination thereof. For instance, UEs equipped with dual radio capabilities might enable simultaneous connection to two networks, i.e., can support RRC Connected mode in both networks, without a need to interrupt the service of the other.

As shown in FIG. 1, the UE 102 may thus be a multi-SIM UE and it may have a first SIM, shown as SIM1, and a second SIM, shown as SIM2, though it should be appreciated that the UE 102 may have more than two SIMs. In the illustrated embodiment, the first wireless communications network 140, such as the first PLMN or NPN, is associated with the first SIM of the UE 102, and the second wireless communications network 160, such as the second PLMN or NPN, is associated with the second SIM of the wireless communication device.

The UE 102 may be registered with both the first and second wireless communications networks 140, 160, which may be respective PLMNs, NPNs, or a combination of PLMN(s) and NPN(s). As used herein, a PLMN is defined as a wireless communications network that provides a combination of wireless communication services offered by an operator. As used herein, an NPN is defined as a private network that is deployed for private use by an entity such as a government or company. In some embodiments, when the UE 102 has multiple SIMs, the different SIMs are associated with different PLMNs or NPNs. In some embodiments, the UE 102 may have more than one SIM which is associated with the same PLMN or NPN, e.g., the UE 102 may have two SIMs from the same operator.

Some aspects of the present disclosure may be implemented in connection with the RRC protocol.

The present disclosure may be implemented in a cloud environment.

The UE 102 may have more than one radio, such as, e.g., both dual receive (Rx) and dual transmit (Tx) capability. The radios may support RRC Connected mode in a network, e.g., one of the first and second wireless communications networks 140, 160, without interrupting service of the other network, e.g., the other one of the first and second wireless communications networks 140, 160.

The number of Rx/Tx radio chains may play a role on how multi-SIM UEs are managed. Furthermore, different possible network configurations and a changing demand for diverse types of operations, e.g., multi-carrier, may affect the complexity of handling communications of multi-SIM UEs UE with multiple networks. Indeed, for UEs with, e.g., dual Rx and dual Tx radios, certain services might require both radios to satisfy quality of service (QOS) requirements, leaving no resources for another network. Properly and timely informing the networks of current capabilities of registered multi-SIM UEs would allow efficient management of resources. Moreover, effectively signalling UE capabilities is also paramount for other radio access scenarios. In this regard, dual radio UEs are not limited to MUSIM applications, and they can exploit advantages offered by dual connectivity (DC), e.g. (NG) EN-DC cases, or carrier aggregation features.

However, given the complexity and pressure that dynamic UE signalling would put on the wireless communications network, it may not be feasible or desired to have devices signalling capabilities in a fully dynamic way while in RRC_CONNECTED mode. In this regard, current RRC protocol specification allows the wireless communications network to retrieve the UE capabilities before establishing a connection. However, currently it is the UE implementation that defines how and what capabilities to signal in case of connection to more than one wireless communications network.

The PCT/IB2020/06032 (WO2021090179), approaches are proposed to tackle issues regarding simultaneous communication to multiple networks.

According to embodiments herein it is provided an improved way for a UE, such as a multi-SIM enabled UE, to inform network(s) of the UE capabilities. In particular, when a UE is registered to multiple wireless communications networks, the UE 102 indicates full capabilities to all of the wireless communications networks. In some embodiments, in case of simultaneous communication issues, the UE indicates, using the IDC assistance information, a list of carrier frequencies and/or carrier frequency combinations that need to be released. A new indication is introduced, from the UE 102 to the network, that the (previous) IDC assistance information message is signaled because the UE is connected to multiple networks and has simultaneous communication issues.

Alternatively, in some embodiments, the UE 102 indicates the list of carrier frequencies and/or carrier frequency combinations that need to be released as part of new MUSIM related assistance information. For example, in some embodiments, an indication for MUSIM operation is provided in a new information element (IE) within the UE assistance information, and this indication may be associated with the IDC assistance information.

In some embodiments, a UE has two SIMs, but it should be appreciated that embodiments of the present disclosure also apply to scenarios with more than two SIMs, and the person skilled in the art will appreciate how the methods described herein would be performed in scenarios with more than two SIMs. As used herein, Multi-SIM may also refer to multi-USIM (MUSIM), and SIM may also refer to USIM.

In some embodiments, the UE 102 may have multiple SIMs. In some embodiments, different multiple SIMs are associated with different wireless communications networks, where a wireless communications network may be a PLMN or a NPN. In some embodiments, it is also possible that the UE 102 has more than one SIM which is associated with the same wireless communications network, e.g. the UE 102 has two SIMs from the same operator. In some embodiments, multiple SIMs are associated to different wireless communications networks, and the methods described herein may also be applied to the scenarios where multiple SIMs are associated with the same wireless communications network.

Furthermore, it should be appreciated that, even though PLMNs are described as examples of wireless communications networks with which the UE 102 communicates, without loss of generality, embodiments herein apply to any kind of wireless communications networks, including NPNs.

In some embodiments, UE capabilities are handled more efficiently in multi-SIM scenarios. Example capabilities which may be affected may comprise and/or relate to, e.g., a number of radio frontends, number of carriers, bandwidth, buffer sizes/memories, soft-buffer sizes/memories, processing capacity, number of PDN connections/PDU sessions, number and/or types of bearers/flows, Dual/Multi-Connectivity and/or Carrier Aggregation (CA) capabilities. The CA capabilities and other capabilities may be same or different for uplink (UL) and downlink (DL) communications, respectively.

In some embodiments, a multi-SIM UE, such as the UE 102, is involved in simultaneous activity/communication with two (or more) wireless communications networks at the same time. For example, the UE 102 may be in an RRC-_CONNECTED mode with both wireless communications networks and, e.g., engage in Internet Protocol (IP) Multimedia Subsystem (IMS) voice communication through one wireless communications network, e.g. a PLMN, while having data transfer in the other wireless communications network. This is possible if a UE is equipped with enough Rx and Tx resources, (2 Rx/2 Tx), but sometimes, in particular for multi-carrier operation (e.g., Dual-Connectivity and Carrier Aggregation configurations), even a single wireless communications network may configure UEs to utilize two Rx and two Tx chains. If a multi-SIM UE is registered with two wireless communications networks at the same time, it may not always be advantageous to allow for such multi-carrier operation. Despite the focus on simultaneous communication with two (or more) wireless communications networks at the same time, the solutions described below are also applicable to the cases when the UE is in an RRC_CONNECTED mode in one wireless communications network while in an RRC_IDLE/RRC_INACTIVE mode in another wireless communications network. For example, while in the RRC_CONNECTED mode in one wireless communications network, the UE 102 may still be active in another wireless communications network and may need one of its Rx/Tx chains to monitor paging occasions in the other wireless communications network. Hence, while the UE 102 is performing activities in the RRC_IDLE/RRC_INACTIVE mode in another wireless communications network, the UE 120 may provide IDC assistance information and/or MUSIM related assistance information to the wireless communications network where it is in the RRC_CONNECTED mode, to assist the wireless communications network on providing a reduced UE configuration.

In general, when the UE 102 is registered with network A only, the UE 102 may provide its capability information to network A, which corresponds to a situation when the UE 102 is only using one of the SIMs. This means that it corresponds to a single-SIM UE and all capabilities that are available in the UE 102, e.g., frequencies, carrier combinations, features, processing, etc., are available for use with network A.

According to aspects of the present disclosure, a multi-SIM capable UE can communicate with two different wireless communications networks simultaneously. Thus, for example, when the UE 102 is registered with PLMN1 and PLMN2, or other types of wireless communications networks, at the same time, the UE 102 will, as in the case when the UE 102 is registered with one wireless communications network only, provide full capabilities to network A and network B, but an updated IDC assistance information or MUSIM assistance information sent to network A takes into consideration that network B may also require resources, e.g., for processing, carrier aggregation, or other features, for situations when simultaneous communication with network A and network B is necessary and/or desired and reduces the UE capabilities for each network. For example, a multi-carrier-capable UE that is registered with two different wireless communications networks and where communication may occur simultaneously with both wireless communications networks, may indicate in the IDC assistance information that specific frequencies or frequency combinations cannot be used due to MUSIM usage. This is to avoid a situation when one of the networks may configure the UE such that not enough radio capability in the UE is left for communication with the other wireless communications network.

Figure 2:
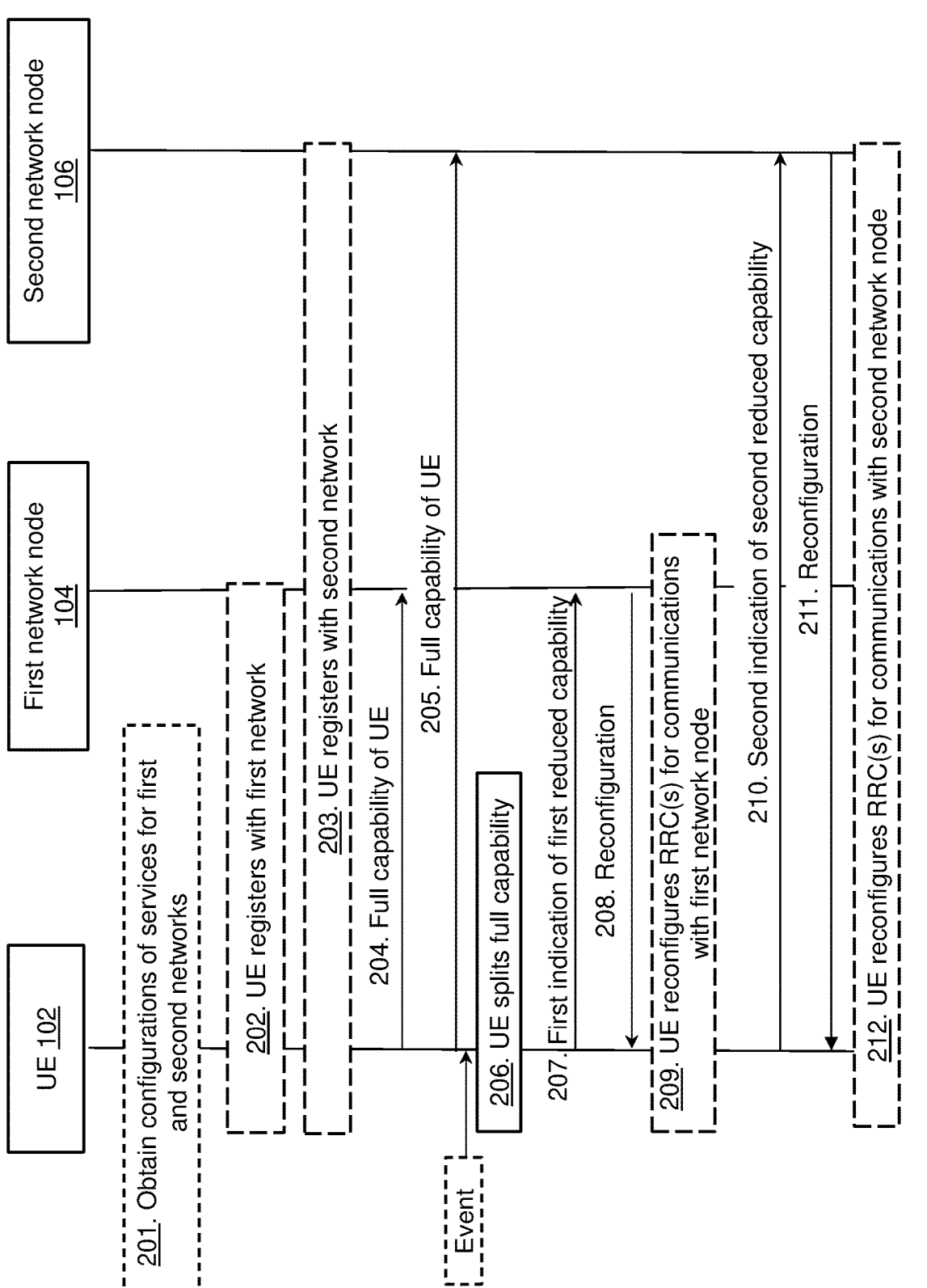
FIG. 2 is a combined signalling scheme and flowchart, showing communications between a UE and first and second network nodes, in accordance with some embodiments.
Figure 4:
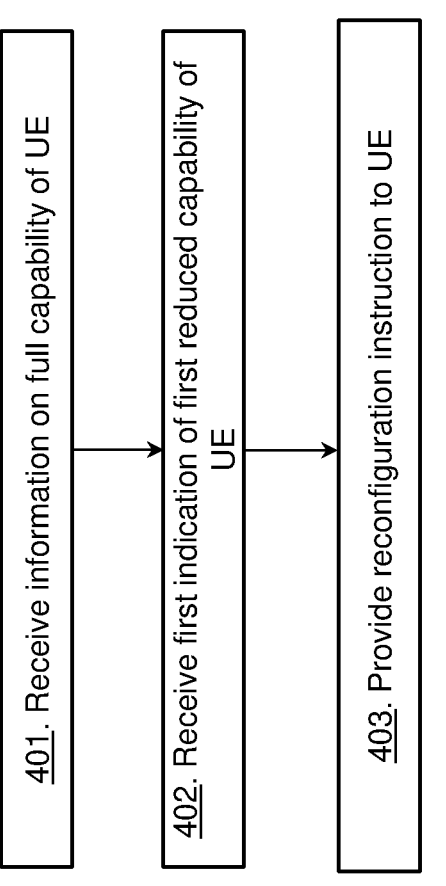
FIG. 4 is a schematic flowchart illustrating a method performed by a first network node, in accordance with some embodiments.

FIG. 2 illustrates an example of communication between a UE, such as the UE 102, and first and second network nodes, such as the first and second network nodes 104, 106, associated with respective different networks, e.g., first and second wireless communications networks 140, 160, in accordance with embodiments of the present disclosure. FIGS. 3 and 4, described below, show the methods performed by the UE 102 and the first network node, separately. Optional actions in FIG. 2 are shown using a dashed line. It should be appreciated that the actions of FIG. 2 may be performed in any suitable order.

Action 201. The UE 102 may obtain configurations of services for the first and second wireless communications networks. The UE 102 optionally obtains configuration(s) (e.g., from an associated user) of particular service(s) to be used for particular networks, such as PLMN(s) or NPN(s). For example, the UE 102 may be configured such that the first wireless communications network is required or preferred to voice service(s) and the second wireless communications network is required or preferred for another service(s), such as e.g., data service(s).

Action 202. The UE 102 may register with the first wireless communications network.

Action 203. The UE 102 may register with the second wireless communications network. Thus, the UE 102 may be simultaneously registered with the first and second wireless communications networks. In some embodiments, the first wireless communications network and the second wireless communications network are different networks. In some embodiments, the first wireless communications network and the second wireless communications network are the same network.

In some embodiments, the first wireless communications network is a first PLMN, or a first NPN, and the second wireless communications network is a second PLMN or a second NPN. Accordingly, in some embodiments, the first and second wireless communications networks may both be PLMNs or NPNs. In some embodiments, the first wireless communications network is a PLMN and the second wireless communications network is an NPN. In some embodiments, the first wireless communications network is an NPN and the second wireless communications network is an PLMN. In some embodiments, one or both the first and second wireless communications networks are a combination of a PLMN and an NPN.

Action 204. The UE 102 provides to the first network node 104, associated with the first wireless communications network associated with the first SIM, information on the full capability of the UE 102.

The information on the full capability may comprise information on one or more out of: a) a number of carriers supported by the UE; b) one or more carrier combinations supported by the UE; c) one or more processing capabilities of the UE; d) one or more features supported by the UE; e) a number of radio frontends that the UE has; f) a bandwidth supported by the UE; g) a buffer or memory size supported by the UE; h) a number of PDN connections or PDU connections supported by the UE; i) one or more carrier aggregation related capabilities of the UE; and j) one or more dual connectivity related capabilities of the UE. The information on the full capability of the UE 102 may include any suitable information.

Action 205. The UE 102 provides to the second network node 106, associated with the second wireless communications network associated with the second SIM, information on the full capability of the UE 102.

Action 206. The UE 102 splits its full capability among the first and second SIMs. The UE 102 splits the full capability among the first and second SIMs into a first reduced capability and a second reduced capability, which may be, e.g., in response to a certain event. In some embodiments, the UE 102 splits its capability based on a configuration of the UE 102. For example, the UE 102 may be configured, e.g. by an end user, such that data traffic is preferred and/or allowed to be communicated over one SIM, while voice is preferred and/or allowed to be communicated over another SIM. In some embodiments, the UE 102 splits its capability randomly.

Action 207. The UE 102 may provide a first indication of the first reduced capability of the UE to the first network node. In some embodiments, the first indication of the first reduced capability is provided in an In-Device-Coexistence (IDC) assistance information. In some embodiments, the first indication of the first reduced capability is provided in the form of a MUSIM assistance information.

Action 208. In response to receiving, from the UE 102, the information on, i.e., the received first indication of, the first reduced capability of the UE, the first network node 104 may provide a first (re) configuration instruction to the UE. The first reconfiguration instruction may be, e.g., an RRC reconfiguration message. The UE 102 may thus receive the first (re) configuration instruction from the first network node 104, as also shown in FIG. 3 discussed below.

The first network node 104 node may provide the first (re) configuration instruction to the UE 102 in response to an event, e.g., an incoming video call or another event such as active data communication. Accordingly, in some embodiments, the first network node 104 provides the (re) configuration instruction to the UE 102 in response to the received information on, i.e. the received first indication of, the first reduced capability of the UE 102 and additionally in response to an event.

Action 209. The UE 102 may then configure or reconfigure at least one RRC resource for communications with the first network node 104 associated with the first wireless communications network, based on the received (re) configuration instruction. The UE 102 may configure its RRC resources in accordance with the received reconfiguration instruction, such as, e.g., the RRC reconfiguration message. In some cases, the UE 102 may (re) configure at least one RRC resource when the UE 102 becomes active, e.g., when voice and/or data communication is to take place.

Action 210. The UE 102 may, alternatively or additionally, provide a second indication of the second reduced capability of the UE to the second network node 106. The second indication may be provided in an IDC assistance information, as a MUSIM assistance information, or as a combination thereof.

In some embodiments, at least one of the first indication of the first reduced capability and the second indication of the second reduced capability is provided in an IDC assistance information.

In some embodiments, at least one of the first indication of the first reduced capability and the second indication of the second reduced capability is provided in the IDC assistance information in combination with a MUSIM indication.

In some embodiments, at least one of the first indication of the first reduced capability and the second indication of the second reduced capability comprises a MUSIM assistance information.

Action 211. In response to receiving, from the UE 102, the information on, i.e., the received second indication of, the second reduced capability of the UE, the second network node 106 may provide a second (re) configuration instruction to the UE. The second reconfiguration instruction may be, e.g., an RRC reconfiguration message. The UE 102 may thus receive the second (re) configuration instruction from the second network node 106, as also shown in FIG. 3 discussed below.

In some embodiments, the second network node 106 may provide the second (re) configuration instruction to the UE 102 in response to an event, e.g., an incoming video call or another event such as, e.g., active data communication. Accordingly, in some embodiments, the second network node 106 provides the second (re) configuration instruction to the UE 102 in response to the received information on, i.e., the received second indication of, the second reduced capability of the UE 102 and additionally in response to an event.

Action 212. The UE 102 may (re) configure at least one RRC resource for communications with the second network node 106 associated with the second wireless communications network, based on the received second (re) configuration instruction. The UE 102 may configure its RRC resources in accordance with the received reconfiguration instruction, such as, e.g., the RRC reconfiguration message.

In some embodiments, the UE 102 provides its reduced capabilities to one or more networks dynamically, as conditions on the network(s), UE requirements, service requirements, and/or other factors change.

FIG. 3 illustrates an example of a method performed by a multi-SIM enabled UE, such as the UE 102, in accordance with embodiments of the present disclosure. The UE 102 has the first and second SIMs, as in the example of FIG. 2. In some embodiments, the UE 102 has multiple SIMs, e.g., three, four, five, six, or more than six SIMs.

Optional actions are shown using a dashed line.

Action 302. The UE 102 may register with a first wireless communications network, e.g., first wireless communications network 140 of FIG. 1.

Action 303. The UE 102 may register with a second wireless communications network, e.g., second wireless communications network 160 of FIG. 1. Thus, the UE 102 may be simultaneously registered with the first and second wireless communications networks. In some embodiments, the first wireless communications network and the second wireless communications network are different networks. In some embodiments, the first wireless communications network and the second wireless communications network are the same network.

In some embodiments, the first wireless communications network is a first PLMN or a first NPN, and the second wireless communications network is a second PLMN or a second NPN. In some embodiments, the first and second wireless communications networks may both be PLMNs or NPNs. In some embodiments, the first wireless communications network is a PLMN and the second wireless communications network is an NPN. In some embodiments, the first wireless communications network is an NPN and the second wireless communications network is an PLMN. In some embodiments, one or both the first and second wireless communications networks are a combination of a PLMN and an NPN.

As used herein, the UE 102 is registered with a wireless communications network, such as with a PLMN or an NPN, means that the UE 102 receives and/or transmits signals with that wireless communications network when in a connected mode. The UE 102 may also be registered with the wireless communications network when in idle mode, in which case the UE 102 is at least ready to receive some signals (e.g., paging signals) from that wireless communications network.

Action 304. The UE 102 provides to the first network node 104, associated with the first wireless communications network associated with the first SIM, information on the full capability of UE.

The information on the full capability may comprise information on one or more out of: a) a number of carriers supported by the UE; b) one or more carrier combinations supported by the UE; c) one or more processing capabilities of the UE; d) one or more features supported by the UE; e) a number of radio frontends that the UE has; f) a bandwidth supported by the UE; g) a buffer or memory size supported by the UE; h) a number of PDN connections or PDU connections supported by the UE; i) one or more carrier aggregation related capabilities of the UE; and j) one or more dual connectivity related capabilities of the UE. The information on the full capability of the UE 102 may include any suitable information.

Action 305. The UE 102 may provide to the second network node 106, associated with the second wireless communications network associated with the second SIM, information on the full capability of UE. In this way, no changes to reporting capability of the UE 102 are required in accordance with embodiments of the present disclosure, as the UE 102 may report its full capability to all wireless communications networks with which the UE 102 is registered.

In some embodiments, this action may be optional, e.g., when the UE 102 is connected only to the first wireless communications network.

Action 306. The UE 102 splits the full capability among the first and second SIMs. The UE 102 splits the full capability among the first and second SIMs into a first reduced capability and a second reduced capability. The UE 102 may split the full capability in response to an event. In some embodiments, the UE 102 splits its full capability randomly.

The UE 102 may be configured such that certain type of traffic is preferred/allowed to be communicated over one or more SIMs, and another type of traffic is preferred/allowed to be communicated over one or more other SIMs. For example, the UE 102 may be configured, e.g., by an end user, such that data traffic is preferred and/or allowed to be communicated over one SIM, while voice is preferred and/or allowed to be communicated over another SIM. In some embodiments, the UE 102 may consider the expected services its SIMs are configured to use, when indicating, e.g., splitting, capabilities for the SIMs. For example, the UE 102 may split its full capabilities such that the SIM that is expected to serve the voice traffic may use only one frequency/carrier, while all the other frequencies/carriers (or frequency combinations) should serve the data traffic. Thus, more resources may be used for the data-SIM and hence high throughputs can be achieved for data communication, while, for the voice-SIM, a single carrier operation is used, which may likely be sufficient for voice communication.

In embodiments herein, the UE 102 may be simultaneously communicating with the first and second wireless communications networks, or with more than two wireless communications networks. Furthermore, in some embodiments, the UE 102 is in an RRC_CONNECTED mode in one wireless communications network, e.g., in one of the first and second wireless communications networks, while the UE 102 is in an RRC_IDLE/RRC_INACTIVE mode in another wireless communications network, e.g., in another one of the first and second wireless communications networks. For example, while in the RRC_CONNECTED mode in one network, the UE 102 may still be active in another wireless communications network and needs one of its Rx/Tx chains to monitor paging occasions in the other wireless communications network. Thus, while the UE 102 is performing activities in the RRC_IDLE/RRC_INAC-TIVE mode in another wireless communications network, the UE 102 may provide IDC assistance information and/or MUSIM related assistance information to the wireless communications network where it is in the RRC_CONNECTED mode, to assist the wireless communications network with providing a reduced UE configuration.

Action 307. The UE 102 provides the first indication of the first reduced capability of the UE to the first network node. For example, the first indication of the first reduced capability may include one or more carrier frequencies, e.g., a list of carrier frequencies and/or carrier frequency combinations, that are not to be used as compared to carrier frequencies in the full capacity of the UE 102.

For example, if the UE 102 is only monitoring paging, it may only be configured for one carrier frequency. Thus, no immediate reconfiguration may be necessary. However, as soon the UE 102 starts any active data communication, where higher data rates can be achieved via, e.g., carrier aggregation, this will be configured via the RRC reconfiguration message, but the carrier frequencies indicated in the (first) reduced capability will not be included/configured for carrier aggregation.

In some embodiments, the first indication of the first reduced capability may be used for a current configuration of the UE 102, which may need to be changed by releasing one or more carrier frequencies.

In some embodiments, the first indication of the first reduced capability may be used for future UE configurations, which may avoid the use of the carrier frequencies indicated in the reduced capability.

In some embodiments, the first indication of the first reduced capability is provided in an IDC assistance information. For example, existing IDC assistance information may be extended with MUSIM information. In some embodiments, the first indication of the (first) reduced capability may be added directly to the existing IDC assistance information. In some embodiments, additionally, an indication indicating a direction of IDC interference may be added to the IDC assistance information. In some embodiments, the first indication of the first reduced capability may include an indication that the required capability limitations are caused by a multi-SIM operation.

In some embodiments, the first indication of the first reduced capability is provided in the form of a MUSIM assistance information. For example, the first indication for MUSIM operation may be provided in a new IE within the UE assistance information. This first indication may be then associated with the IDC assistance information. Thus, in some embodiments, the MUSIM assistance information is separated from the IDC assistance information and the IDC assistance information is not modified due to MUSIM.

In some embodiments, the first indication of the first reduced capability is provided as a combination of the IDC and MUSIM assistance information.

For example, continuing with the example described in connection with the Action 208, above, if the first SIM is expected to serve data traffic, the IDC assistance information or the MUSIM assistance information may indicate only one frequency/carrier. If, however the first SIM is expected to serve voice traffic, the IDC assistance information or the MUSIM assistance information may indicate all frequencies/frequency combinations except that one frequency which is to serve the voice traffic. Thus, the UE 102 may provide a first indication of its (reduced) capabilities which indicates which resources, such as, e.g., frequency/carrier or frequency/carrier combination(s), are available for use.

Action 308. The UE 102 may receive a first (re) configuration instruction from the first network node 104, in response to the first indication of the first reduced capability provided to the first network node 104. The first reconfiguration instruction may be, e.g., an RRC reconfiguration message.

Action 309. The UE 102 may configure at least one RRC resource based on the received reconfiguration instruction. The UE 102 may (re) configure its RRC resources in accordance with the received reconfiguration instruction, such as, e.g., the RRC reconfiguration message.

The UE 102 may (re) configure its current configuration, which may need to be changed by, e.g., releasing one or more carrier frequencies.

In some embodiments, additionally or alternatively, the reconfiguration instruction from the first network node 104 and/or the first reduced capability may be used for future UE configurations, which may avoid the use of the carrier frequencies indicated in the first reduced capability.

Action 310. The UE 102 may, alternatively or additionally, provide the second indication of the second reduced capability of the UE to the second network node 106. For example, the second indication of the second reduced capability may include one or more carrier frequencies, e.g., a list of carrier frequencies and/or carrier frequency combinations, that are not to be used as compared to carrier frequencies in the full capacity of the UE 102.

In some embodiments, the second indication of the second reduced capability may be used for a current configuration of the UE 102, which may need to be changed by releasing one or more carrier frequencies.

In some embodiments, the second indication of the reduced capability may be used for future UE configurations, which may avoid the use of the carrier frequencies indicated in the second reduced capability.

In some embodiments, the second indication of the second reduced capability is provided in an IDC assistance information. In some embodiments, both the first indication of the first reduced capability and the second indication of the second reduced capability are provided in an IDC assistance information. In some embodiments, the second indication of the second reduced capability is provided in the form of a MUSIM assistance information. In some embodiments, both the first indication of the first reduced capability and the second indication of the second reduced capability are provided as the MUSIM assistance information.

In some embodiments, the second indication of the second reduced capability is provided as a combination of the IDC and MUSIM assistance information.

In some embodiments, the second indication of the second reduced capability is provided in an IDC assistance information. For example, existing IDC assistance information may be extended with MUSIM information. In some embodiments, the second indication of the (second) reduced capability may be added directly to the existing IDC assistance information. In some embodiments, an indication indicating a direction of IDC interference may be added to the IDC assistance information. In some embodiments, the second indication of the second reduced capability may include an indication that the required capability limitations are caused by a multi-SIM operation.

In some embodiments, the second indication of the second reduced capability is provided in the form of a MUSIM assistance information. For example, the second indication for MUSIM operation may be provided in a new IE within the UE assistance information. This second indication may be then associated with the IDC assistance information.

In some embodiments, the second indication of the second reduced capability is provided as a combination of the IDC and MUSIM assistance information.

In some embodiments, at least one of the first indication of the first reduced capability and the second indication of the second reduced capability is provided in an IDC assistance information.

In some embodiments, at least one of the first indication of the first reduced capability and the second indication of the second reduced capability is provided in the IDC assistance information in combination with a MUSIM indication.

In some embodiments, at least one of the first indication of the first reduced capability and the second indication of the second reduced capability comprises a MUSIM assistance information.

In some embodiments, this action may be optional, e.g., when the UE 102 is connected only to the first wireless communications network.

Action 311. The UE 102 may receive a second (re) configuration instruction from the second network node 106, in response to the second indication of the second reduced capability provided to the second network node 106. The second reconfiguration instruction may be, e.g., an RRC reconfiguration message.

Action 312. The UE 102 may (re) configure at least one RRC resource based on the received reconfiguration instruction. The UE 102 may (re) configure its RRC resources in accordance with the received reconfiguration instruction, such as, e.g., the RRC reconfiguration message.

In some embodiments, the UE 102 may (re) configure its current configuration, which may need to be changed by, e.g., releasing one or more carrier frequencies.

In some embodiments, additionally or alternatively, the reconfiguration instruction from the second network node 106 and/or the second reduced capability may be used for future UE configurations, which may avoid the use of the carrier frequencies indicated in the second reduced capability.

It should be appreciated that the above actions of FIG. 3 may be performed in any suitable order. For example, communications of the UE with the first and second network nodes may occur simultaneously. In some cases, the UE 102 communicates with the second network node before the UE communicates with the first network node.

FIG. 4 illustrates an example of a method performed by the first network node associated with a first wireless communications network. The first network node 104 may be exemplified as the first network node 104 but also as the second network node 106 associated with first and second wireless communications networks 140, 160, respectively, in accordance with embodiments of the present disclosure. The method of FIG. 4 is described in connection with the first network node 104 (see also FIG. 2), for illustration purposes only, as any network node may communicate with a UE, such as the UE 102, in accordance with embodiments of the present disclosure. Optional actions are shown using a dashed line.

Action 401. The first network node 104 receives information on the full capability of the UE 102. The first network node 104 may receive, from the UE 102, information on the full capability of the UE 102, wherein the UE 102 has at least two SIMs, and is simultaneously registered with the first wireless communications network and at least one other wireless communications network.

Action 402. The first network node 104 may receive information on a reduced capability of the UE 102. For example, as discussed above for the UE 102, the UE 102 may, e.g., upon an event, split its full capacity among the UE's SIMs, such as, e.g., among the first and second SIMs. The first network node 104 may receive, from the UE 102, the first indication of the first reduced capability of the UE 102 indicating a split of the full capability of the UE 102 among the at least two SIMs. In some embodiments, the first indication of the first reduced capability is provided in an IDC assistance information. In some embodiments, the first indication of the first reduced capability is provided in the IDC assistance information in combination with a MUSIM indication. In some embodiments, the first indication of the first reduced capability comprises a MUSIM assistance information. In some embodiments, the MUSIM assistance information is separated from the IDC assistance information and the IDC assistance information is not modified due to MUSIM. In case the first network node is illustrated as the second network node 106 the first indication would be exemplified as the second indication.

Action 403. The first network node 104 may provide a (re) configuration instruction to the UE 102, in response to the received information on, i.e., the received first indication of, the first reduced capability of the UE 102. The first network node 104 may take into account the UE's reduced capabilities when sending an RRC (re) configuration message.

In some cases, an immediate reconfiguration may not be necessary if the UE 120 is inactive, e.g., no voice/data communication. Thus, the first network node 104 may not send the reconfiguration instruction right away upon receiving the information on the reduced capability.

In some embodiments, the first network node 104 may provide a (re) configuration instruction to the UE 102 in response to an event, e.g. an incoming video call or another event that involves active data communication. In some cases, e.g., if the second wireless communications network requires more frequencies, the frequencies for carrier aggregation may need to be released/reduced in the first wireless communications network. Accordingly, in some embodiments, the first network node 104 provides the (re) configuration instruction to the UE 102 in response to the received information on, i.e., the received first indication of, the first reduced capability of the UE 102 and additionally in response to an event.

Figure 5:
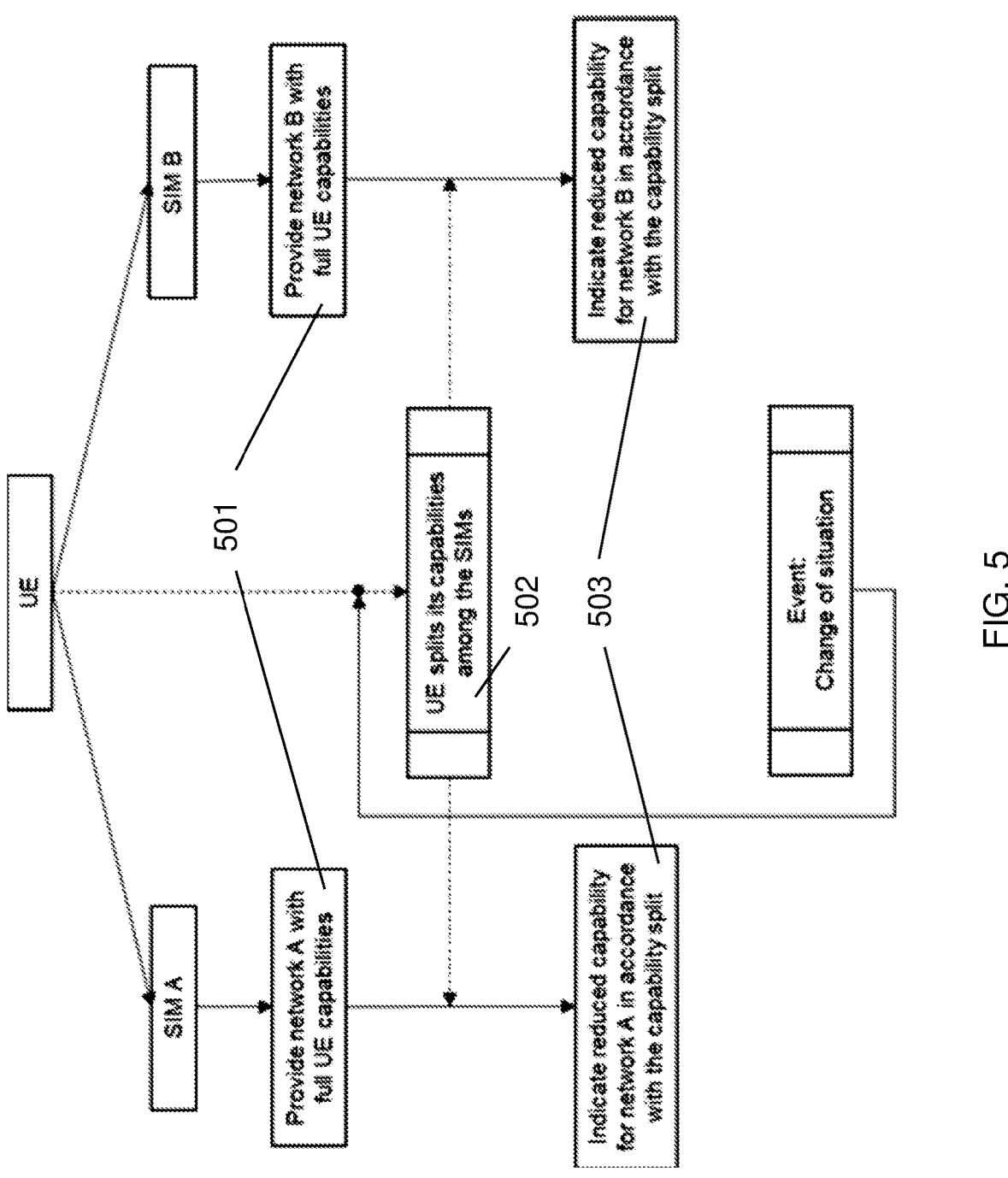
FIG. 5 is another schematic flowchart depicting a method performed by a UE, in accordance with some embodiments.

FIG. 5 additionally illustrates a method performed by the UE 102, showing a UE behavior when its capabilities are impacted during simultaneous communication using multiple SIMs, in accordance with some embodiments. In this example, the UE 102, is shown to have SIMs A and B, each used for communication with networks A and B, e.g., first and second wireless communications networks 140, 160, or any other wireless communications networks, respectively. The UE 102 provides the networks A and B with the full UE capabilities, action 501. Upon an event, such as a change in a current situation or another event, the UE 102 may split its capabilities among the SIMS A and B, action 502. The UE 102 then indicates a reduced capability for the network A in accordance with the capability split, and a reduced capability for the network B in accordance with the capability split, action 503. The UE 102 may provide information on its reduced capability to the networks A and B using, e.g., a MUSIM related assistance information indicating the reduced capability.

In some embodiments, the indication of the reduced capability may be provided, from the UE 102 to the network, using an IDC assistance information.
In-Device Coexistence (IDC)

With the increasing demand to have seamless data connectivity to several wireless communications networks, many devices are designed to support different radio access technologies (RAT) for parallel usage. In order to support this parallel operation, the devices are equipped with multiple radio transceivers, which are located extremely close to each other. When the different radio technologies operate simultaneously, these transceivers may interfere with each other, resulting in an IDC interference. To solve this issue, new UE IDC assistance information was introduced to mitigate the IDC interference for NR Rel-16. Thus, for simultaneous operation, the UE 102 may signal to the NR network a frequency list or a frequency combination list that should be avoided during NR operation. Together with the frequency, the interference direction can be indicated, e.g., NR, other, or both, where "other" radio refers to either the Industrial, Scientific and Medical band (ISM) radio or Global Navigation Satellite Systems (GNSS), and, together with the frequency combination, the victim system type can be indicated when UL CA is configured. The current victim system types that can be indicated in Rel-16 are GNSS types (gps, glonass, bds, galileo and navIC), WLAN and Bluetooth.

```
IDC-Assistance-r16 ::=                  SEQUENCE {
    affectedCarrierFreqList-r16             AffectedCarrierFreqList-r16
OPTIONAL,
    affectedCarrierFreqCombList-r16         AffectedCarrierFreqCombList-
r16     OPTIONAL,
    ...
}
AffectedCarrierFreqList-r16 ::=    SEQUENCE (SIZE (1..maxFreqIDC-r16)) OF
AffectedCarrierFreq-r16
AffectedCarrierFreq-r16 ::=         SEQUENCE {
    carrierFreq-r16                         ARFCN-ValueNR,
    interferenceDirection-r16               ENUMERATED {nr, other, both, spare}
}
AffectedCarrierFreqCombList-r16 ::=      SEQUENCE (SIZE (1..maxCombIDC-r16))
OF AffectedCarrierFreqComb-r16
AffectedCarrierFreqComb-r16 ::=          SEQUENCE {
    affectedCarrierFreqComb-r16                 SEQUENCE (SIZE
(2..maxNrofServingCells)) OF ARFCN-ValueNR   OPTIONAL,
    victimSystemType-r16                    VictimSystemType-r16
}
VictimSystemType-r16 ::=        SEQUENCE {
    gps-r16                         ENUMERATED {true}   OPTIONAL,
    glonass-r16                     ENUMERATED {true}   OPTIONAL,
    bds-r16                         ENUMERATED {true}   OPTIONAL,
    galileo-r16                     ENUMERATED {true}   OPTIONAL,
    navIC-r16                       ENUMERATED {true}   OPTIONAL,
    wlan-r16                        ENUMERATED {true}   OPTIONAL,
    bluetooth-r16                   ENUMERATED {true}   OPTIONAL,
    ...
}
```

In embodiments herein, as described above and exemplified below, the existing IDC assistance information may be used to indicate to a network a reduced capability of the UE. In some embodiments, the IDC assistance information may thus be extended with a MUSIM information. For example, an additional indication may be added to the existing IDC assistance information. In some embodiments, the indication that uses the IDC assistance information indicates a direction of IDC interference.

Several example implementations will now be described, in accordance with embodiments of the present disclosure.

Example Implementation for Services/Same Prioritization for the SIMS

If a UE has the possibility to support up to 6 (six) carriers in total, the UE 102 may indicate in its capabilities that it supports 6 carriers (that the UE indicates the number of carriers in its supported band-combinations). If the UE operates using only one SIM, no IDC assistance information is sent to the serving network. If the UE operates using two SIMs, the UE may indicate to a first wireless communications network that specific bands/band combinations covering 3 carriers cannot be used, via the IDC assistance information, while indicating to a second wireless communications network that other bands or band combinations covering 3 carriers cannot be used.

As an example, the UE 102 may support the following carriers: f1a, f1b, f1c, f1d, f2a and f2b. In such a case, equal split of the carriers may not be possible, such that the UE 102 would need to assign all carriers on f1 to SIM1 (IDC for SIM1 indicates f2a and f2b) and all carriers on f2 to SIM2 (IDC for SIM2 indicates f1a, f1b, f1c and f1d), or vice versa, e.g. depending on how many carriers the already active SIM is already using, depending on other criteria, or decided randomly which of the SIMs can be configured with up to 4 carriers, while the other SIM can only be configured with at most 2 carriers.

Example Implementation for Known Services Associated with Each SIM

The UE 102 may be configured, e.g. by an end user, such that data traffic is preferred/allowed to be communicated only over one SIM, while voice is preferred/allowed to be communicated over another SIM.

According to one aspect of the present disclosure, the UE 102 considers the expected services its SIMs are configured to use, when indicating capabilities for the SIMs. For example, the UE 102 indicates for the SIM which is expected to serve data traffic IDC or MUSIM assistance information to indicate only one frequency/carrier, while the UE 102 indicates that all frequencies/frequency combinations, except one frequency, are affected for the SIM which should serve voice traffic. The benefit with this is that more resources may be used for the data-SIM and hence high throughputs can be achieved for data communication, while, for the voice-SIM, only single carrier operation is used, which likely is sufficient for voice communication.

In principle, it may be considered that the SIM used for voice services would anyway only use one carrier and thus, no IDC assistance information would be needed. However, if the network intends to, e.g., perform load balancing between different carrier frequencies, it needs to know whether the other frequency can be used by the UE 102 or not since the frequency may be configured for the data-SIM already. Thus, the IDC and/or MUSIM assistance information should always be transmitted to avoid operational issues during simultaneous operation of the SIMs.

The UE 102 may e.g. support the following carriers: $f_{1a}$, $f_{1b}$, $f_{1c}$, $f_2$, $f_{3a}$ and $f_{3b}$ in the frequency bands $f_1$, $f_2$, and $f_3$, respectively. For convenience, it may be assumed that all carriers have the same bandwidth. SIM1 is associate with voice, and SIM2 is associated with data.

If $f_{1a}$ is used by SIM1, fib and fic can no longer be used by SIM2. Same for $f_{3a}$ and $f_{3b}$. Thus, to maximize the number of frequencies to be used for SIM2, the UE 102 signals to network 1 which is associated with SIM1 (voice services), that it cannot use $f_{1a}$, $f_{1b}$, $f_{1c}$, $f_{3a}$ and $f_{3b}$. For network 2 being associated with SIM2 (data services), the UE 102 indicates via the IDC and/or MUSIM assistance information that it cannot use $f_2$.

Thus, only $f_2$ can be used for SIM1, and $f_{1a}$, $f_{1b}$, $f_{1c}$, $f_{3a}$ and $f_{3b}$ can be aggregated for SIM2 in accordance with the UE's supported band combination(s). Accordingly, in some embodiments, the UE 102 indicates to the wireless communications network, i.e. to the network node associated with the network, which one or more resources, e.g. carrier frequencies, are not available for use in communication of the UE 102 with the wireless communications network.

Additional Information for Limited Capabilities in Multi-SIM Scenarios

For any of the above approaches to indicate limited capability via the IDC and/or MUSIM assistance information, the UE 120 may indicate that the capability reduction is for multi-SIM operation, such that the network can optimize the UE configuration in accordance with the actual UE capability and the current situation with regard to simultaneous connectivity to multiple networks using different SIMs.

Option 1: Extend IDC Assistance Information with MUSIM Information

This indication can be added directly to the existing IDC assistance information, e.g. by using the spare values, e.g. for the AffectedCarrierFreq IE some more detailed information can be introduced for the interferenceDirection than only 'nr'. Furthermore, the UE 102 could use one radio for LTE and one for NR, so that 'nr' would not be the correct description. Rather, the spare value could be replaced by e.g. 'musim', with reference to TS 38.331:

```
AffectedCarrierFreq-r16 ::=  SEQUENCE {
    carrierFreq-r16              ARFCN-ValueNR,
    interferenceDirection-r16    ENUMERATED {nr, other, both, musim-
    r18}
}
``` interferenceDirection

Indicates the direction of IDC interference. Value nr indicates that only NR is victim of IDC interference, value other indicates that only another radio is victim of IDC interference and value both indicates that both NR and another radio are victims of IDC interference, and value musim indicates that the radio used for MUSIM purposes is victim of IDC interference. The other radio refers to either the Industrial, Scientific and Medical band (ISM) radio or Global Navigation Satellite Systems (GNSS) (see TR 36.816 [44]).

Alternatively, a new parallel list may be created where a detailed interference direction is given for MUSIM, where a source value corresponds to the current network for which the UE provides IDC assistance information, and a target value corresponds to another network the UE is registered with. The UE 102 may include the same number of entries in interferenceDirection-r18 as provided for affectedCarrierFreqList. For backwards compatibility, the UE 102 may set the interferenceDirection-r16 to value 'nr'.

```
IDC-Assistance-r16 ::=              SEQUENCE {
    affectedCarrierFreqList-r16         AffectedCarrierFreqList-r16
OPTIONAL,
    affectedCarrierFreqCombList-r16     AffectedCarrierFreqCombList-
r16      OPTIONAL,
    ...,
    [[
    interferenceDirection-r18 ENUMERATED {source, target, both}
OPTIONAL -- Need N
    ]]
}
```

The indication of IDC for UL CA (i.e. affectedCarrier-FreqCombList-r16) can also be used as the first/second indication on UE capability reduction for multi-SIM operation. For instance, the UE 102 may support the current configuration for DL from both wireless communications networks in which the UE 102 is in a RRC_CONNECTED mode, but it may not support certain UL CA configuration, given that such UL resources may be in use by one of the wireless communications networks. Hence, affectedCarrier-FreqCombList-r16 may indicate the affected UL CA configuration from the UE, or a subset of such configuration, e.g., the UE 102 may be configured with 3 UL serving cells but report only 2 carriers as affected. To account for the multi-SIM operation, a new victimSystem Type can be added, e.g., '3gpp-musim' or similar, to indicate that the required capability limitations are caused by multi-SIM operation:

```
VictimSystemType-r16 ::=       SEQUENCE {
    gps-r16                        ENUMERATED {true}   OPTIONAL,
    glonass-r16                    ENUMERATED {true}   OPTIONAL,
    bds-r16                        ENUMERATED {true}   OPTIONAL,
    galileo-r16                    ENUMERATED {true}   OPTIONAL,
    navIC-r16                      ENUMERATED {true}   OPTIONAL,
    wlan-r16                       ENUMERATED {true}   OPTIONAL,
    bluetooth-r16                  ENUMERATED {true}   OPTIONAL,
```

-continued

```
    ...
    [[
    3gpp-musim-r18                 ENUMERATED {true}   OPTIONAL
    ]]
}
```

Alternatively, the new 3gpp-musim-r18 field can also include multiple values to indicate which multi-SIM operation caused interference e.g., Physical Downlink Control Channel (PDCCH) for PDCCH monitoring, paging occasion monitoring, carrier aggregation, etc.

```
VictimSystemType-r16 ::=       SEQUENCE {
    gps-r16                        ENUMERATED {true}   OPTIONAL,
    glonass-r16                    ENUMERATED {true}   OPTIONAL,
    bds-r16                        ENUMERATED {true}   OPTIONAL,
    galileo-r16                    ENUMERATED {true}   OPTIONAL,
    navIC-r16                      ENUMERATED {true}   OPTIONAL,
    wlan-r16                       ENUMERATED {true}   OPTIONAL,
    bluetooth-r16                  ENUMERATED {true}   OPTIONAL,
    ...
    [[
    3gpp-musim-r18                 3GPP-MUSIM-r18   OPTIONAL
    ]]
}
3GPP-MUSIM-r18 ::=             SEQUENCE {
    pdcch-Monitoring               OPTIONAL,
    po-Monitoring                  OPTIONAL,
    carrierAggregation             OPTIONAL,
    ...
}
```

Option 2: MUSIM Assistance Information is Introduced and Refers to IDC Information In some embodiments, an alternative option is to provide the first/second indication for MUSIM operation in a new information element (IE) within the UE assistance information, i.e. simply on a different level, and then associate the indication with the IDC assistance information.

```
UEAssistanceInformation-v1610-IEs ::= SEQUENCE {
    idc-Assistance-r16                    IDC-Assistance-r16
OPTIONAL,
    drx-Preference-r16                    DRX-Preference-r16
OPTIONAL,
    maxBW-Preference-r16                  MaxBW-Preference-r16
OPTIONAL,
    maxCC-Preference-r16                  MaxCC-Preference-r16
OPTIONAL,
    maxMIMO-LayerPreference-r16           MaxMIMO-LayerPreference-r16
OPTIONAL,
    minSchedulingOffsetPreference-r16     MinSchedulingOffsetPreference-r16
OPTIONAL,
    releasePreference-r16                 ReleasePreference-r16
OPTIONAL,
    sl-UE-AssistanceInformationNR-r16     SL-UE-AssistanceInformationNR-r16
OPTIONAL,
    referenceTimeInfoPreference-r16       BOOLEAN
OPTIONAL,
    nonCriticalExtension                  UEAssistanceInformation-v1800-IEs
OPTIONAL
}
UEAssistanceInformation-v1800-IEs ::= SEQUENCE {
    musim-Assistance-r18                  MUSIM-Assistance-r18
OPTIONAL, -- Need R
    nonCriticalExtension                  SEQUENCE { }
OPTIONAL
}
```

-continued

```
MUSIM-Assistance-r18 ::=        SEQUENCE {
    idc-Impact-r18                  ENUMERATED {true}
OPTIONAL,
    nonCriticalExtension            SEQUENCE { }
OPTIONAL
}
```

However, as the IDC assistance information includes a list of affected carriers and/or affected carrier combinations (affectedCarrierFreqList and affectedCarrierFreqCombList), a 1-bit indication may not provide sufficient granularity. Therefore, a parallel list may be used, where each entry corresponds to the affected carrier or affected carrier combination in the combined list(s). One possible example is provided below:

```
MUSIM-Assistance-r18 ::=    SEQUENCE {
    idc-ImpactList-r18             IDC-ImpactList-r18
OPTIONAL, -- Need R
    nonCriticalExtension           SEQUENCE { }
OPTIONAL
}
IDC-ImpactList-r18 ::=         SEQUENCE (SIZE (1..maxIDC-r18)) OF
IDC-Impact-r18
IDC-Impact-r18 ::=            SEQUENCE {
    idc-Impact                     ENUMERATED {true}
OPTIONAL
}
```

The new IE dedicated for multi-SIM may also instantiate the ones defined in Rel-16 for IDC. In this manner, the UE 102 may provide independently IDC issues for legacy purposes defined in Rel-16 from the IDC issues that may occur in case of multi-SIM. This can also avoid a possibility that legacy wireless communications networks wrongly interpret a Rel-16 IDC report as one of the IDC cases defined in Rel-16.

```
MUSIM-Assistance-r18 : :=           SEQUENCE {
    affectedCarrierFreqListMUSIM-r18              AffectedCarrierFreqList-r16
OPTIONAL,
    affectedCarrierFreqCombListMUSIM-r18          AffectedCarrierFreqCombList-
r16       OPTIONAL,
    ...
}
```

The advantage of the above approach is that the MUSIM assistance information is separated from the IDC assistance information and the IDC assistance information is not modified due to MUSIM.

FIG. 6 depicts an example of a UE, such as the UE 102, in accordance with embodiments herein. The UE 102 may have at least a first SIM and a second SIM.

The UE 102 may comprise processing circuitry 611, e.g. one or more processors, configured to perform the methods herein.

The UE 102 may comprise a providing unit 612, e.g. a transmitter or a transceiver. The UE 102, the processing circuitry 611, and/or the providing unit 612 are configured to provide, to a first network node associated with the first wireless communications network associated with the first SIM, information on full capability of the UE 102, wherein the UE 102 is registered with the first wireless communications network. The UE 102, the processing circuitry 611, and/or the providing unit 612 are also configured to provide, to a second network node associated with the second wireless communications network associated with the second SIM, the information on the full capability of the UE 102, wherein the UE 102 is registered with the second wireless communications network such that the UE 102 is simultaneously registered with the first wireless communications network and the wireless communications second network.

The UE 102, the processing circuitry 611, and/or the providing unit 612 are further configured to provide the first indication of the first reduced capability to the first network node, and/or to provide the second indication of the second reduced capability to the second network node.

The UE 102 may comprise a splitting unit 614. The UE 102, the processing circuitry 611, and/or the splitting unit 614 may be configured to split the full capability among the first and second SIMs into a first reduced capability and a second reduced capability. This may occur in response to an event. In some embodiments, the UE 102 splits its capability randomly.

The UE 102 may comprise a receiving unit 616, e.g., a receiver or a transceiver. The UE 102, the processing circuitry 611, and/or the receiving unit 616 may be configured to receive a (re) configuration instruction from at least one of the first and second network nodes, in response to at least one of the first indication of the first reduced capability provided to the first network node and the second indication of the second reduced capability provided to the second network node.

The UE 102 may comprise a reconfiguring unit 618. The UE 102, the processing circuitry 611, and/or the reconfiguring unit 618 may be configured to configure or reconfigure at least one RRC resource based on the received configuration instruction.

The UE 102 further comprises a memory 615. The memory 615 comprises one or more units to be used to store data on, such as indications, contexts, measurements, thresholds, data related to nodes, and applications to perform the methods disclosed herein when being executed, and similar. Furthermore, the UE 102 may comprise a communication interface 620 such as comprising a transmitter, a receiver and/or a transceiver. In embodiments herein, the communication interface 620 may comprise dual Rx and Tx radios. In some embodiments, the communication interface 620 comprises more than two radios.

The methods according to the embodiments described herein for the UE 102 are respectively implemented using e.g., a computer program product 626 or a computer program, comprising instructions, i.e., software code portions, which, when executed on at least one processor, cause the at least one processor to carry out the actions described herein, as performed by the UE 102. The computer program product 626 may be stored on a computer-readable storage medium 627, e.g. a disc, a universal serial bus (USB) stick or similar. The computer-readable storage medium 627, having stored thereon the computer program product, may comprise the instructions which, when executed on at least one processor, cause the at least one processor to carry out the actions described herein, as performed by the UE 102. In some embodiments, the computer-readable storage medium may be a transitory or a non-transitory computer-readable storage medium. Thus, embodiments herein may disclose a UE for handling communication in a wireless communications network, wherein the UE comprises processing circuitry and a memory, the memory comprising instructions executable by the processing circuitry whereby the UE is operative to perform any of the methods herein.

FIG. 7 depicts an example of a first network node, such as the first network node 104 or the second network node 106, referred to as a network node, in accordance with embodiments herein. It should be appreciated that the first network 104 and the second network node 106 (see FIGS. 1 and 2) may have the same or similar configurations, and are therefore not described separately herein.

The first network node may comprise processing circuitry 711, e.g. one or more processors, configured to perform the methods herein.

The first network node may comprise a receiving unit 712, e.g. a receiver or a transceiver. The first network node, the processing circuitry 711, and/or the receiving unit 712 are configured to receive, from the UE 102, information on a full capability of the UE 102, wherein the UE 102 has at least two SIMs, e.g., multiple SIMs, and is simultaneously registered with the wireless communications network and at least one another network. The first network node, the processing circuitry 711, and/or the receiving unit 712 are configured to receive, from the UE 102, the first indication of the first reduced capability of the UE 102 indicating a split of the full capability of the UE 102 among the at least two SIMs.

The first network node may comprise a providing unit 714, e.g. a transmitter or a transceiver. The first network node, the processing circuitry 711, and/or the providing unit 714 may be configured to provide, to the UE 102, a (re) configuration instruction, in response to the received first indication of the first reduced capability of the UE 102 and/or in response to an event.

The first network node further comprises a memory 715. The memory 715 comprises one or more units to be used to store data on, such as indications, contexts, measurements, thresholds, data related to nodes, and applications to perform the methods disclosed herein when being executed, and similar. Furthermore, the first network node may comprise a communication interface 720 such as comprising a transmitter, a receiver and/or a transceiver.

The methods according to the embodiments described herein for the first network node are respectively implemented using e.g., a computer program product 726 or a computer program, comprising instructions, i.e., software code portions, which, when executed on at least one processor, cause the at least one processor to carry out the actions described herein, as performed by the first network node. The computer program product 726 may be stored on a computer-readable storage medium 727, e.g. a disc, a universal serial bus (USB) stick or similar. The computer-readable storage medium 727, having stored thereon the computer program product, may comprise the instructions which, when executed on at least one processor, cause the at least one processor to carry out the actions described herein, as performed by the first network node. In some embodiments, the computer-readable storage medium may be a transitory or a non-transitory computer-readable storage medium. Thus, embodiments herein may disclose a first network node for handling communication in a wireless communications network, wherein the network node comprises processing circuitry and a memory, the memory comprising instructions executable by the processing circuitry whereby the first network node is operative to perform any of the methods herein.

In some embodiments, a more general term "network node" is used and it can correspond to any type of radio-network node or any network node, which communicates with a wireless device and/or with another network node. Examples of network nodes are NodeB, MeNB, SeNB, a network node belonging to Master cell group (MCG) or Secondary cell group (SCG), base station (BS), multi-standard radio (MSR) radio node such as MSR BS, eNodeB, network controller, radio-network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), etc.

In some embodiments, the non-limiting term wireless device or user equipment (UE) is used and it refers to any type of wireless device communicating with a network node and/or with another wireless device in a cellular or mobile communication system. Examples of UE are IoT capable device, target device, device to device (D2D) UE, proximity capable UE (aka ProSe UE), machine type UE or UE capable of machine to machine (M2M) communication, Tablet, mobile terminals, smart phone, laptop embedded equipped (LEE), laptop mounted equipment (LME), USB dongles, etc.

Embodiments are applicable to any RAT or multi-RAT systems, where the wireless device receives and/or transmit signals (e.g. data) e.g. New Radio (NR), Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

As will be readily understood by those familiar with communications design, that functions means or circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware and/or program or application data. Other hardware, conventional and/or custom, may also be included. Designers of communications devices will appreciate the cost, performance, and maintenance trade-offs inherent in these design choices.

Embodiments herein relate to:

Embodiment 1

A method performed by a user equipment, UE, (102) having multiple Subscriber Identity Modules, SIMs, for simultaneous communication with two or more networks, the method comprising:

providing (304), to a first network node associated with a first network associated with a first SIM, information on full capability of the UE (102), wherein the UE (102) is registered with the first network;

providing (305), to a second network node associated with a second network associated with a second SIM, the information on the full capability of the UE (102), wherein the UE (102) is registered with the second network such that the UE (102) is simultaneously registered with the first network and the second network;

splitting (306) the full capability among the first and second SIMs into a first reduced capability and a second reduced capability;

providing (307) an indication of the first reduced capability to the first network node; and/or providing (310) an indication of the second reduced capability to the second network node.

Embodiment 2

The method of embodiment 1, wherein the information on the full capability comprises information on one or more out of: a) a number of carriers supported by the UE (102); b) one or more carrier combinations supported by the UE (102); c) one or more processing capabilities of the UE (102); d) one or more features supported by the UE (102); e) a number of radio frontends that the UE (102) has; f) a bandwidth supported by the UE (102); g) a buffer or memory size supported by the UE (102); h) a number of PDN connections or PDU connections supported by the UE (102); i) one or more carrier aggregation related capabilities of the UE (102); and j) one or more dual connectivity related capabilities of the UE (102).

Embodiment 3

The method of embodiment 1 or 2, wherein at least one of the indication of the first reduced capability and the indication of the second reduced capability is provided in an In-Device-Coexistence (IDC) assistance information.

Embodiment 4

The method of embodiment 3, wherein at least one of the indication of the first reduced capability and the indication of the second reduced capability is provided in the IDC assistance information in combination with a multiple SIM, MUSIM, indication.

Embodiment 5

The method of embodiment 1 or 2, wherein at least one of the indication of the first reduced capability and the indication of the second reduced capability comprises a multiple SIM, MUSIM, assistance information.

Embodiment 6

The method of any of the embodiments 1 to 5, wherein the first network and the second network are different networks.

Embodiment 7

The method of any of the embodiments 1 to 5, wherein the first network and the second network are the same network.

Embodiment 8

The method of embodiment 6 or 7, wherein the first network is a first Public Land Mobile Network, PLMN, or a first non-public network (NPN), and wherein the second network is a second PLMN or a second NPN.

Embodiment 9

The method of any of the embodiments 1 to 8, wherein the splitting of the full capability among the first and second SIMs is performed in response to an event.

Embodiment 10

The method of any of the embodiments 1 to 9, wherein at least one of the indication of the first reduced capability and the indication of the second reduced capability comprises an indication of one or more carrier frequencies that are not to be used as compared to carrier frequencies in the full capacity.

Embodiment 11

The method of any of the embodiments 1 to 10, further comprising:

receiving (308, 311) a configuration instruction from at least one of the first and second network nodes, in response to at least one of the indication of the first reduced capability provided to the first network node and the indication of the second reduced capability provided to the second network node; and configuring (309, 312) at least one radio resource control (RRC) resource based on the received configuration instruction.

Embodiment 12

A method performed by a network node associated with a wireless communications network, the method comprising:

receiving (401), from a user equipment, UE, (102), information on a full capability of the UE (102), wherein the UE (102) has at least two Subscriber Identity Modules, SIMs, and is simultaneously registered with the wireless communications network and at least one another network;

receiving (402), from the UE (102), an indication of a reduced capability of the UE (102) indicating a split of the full capability of the UE (102) among the at least two SIMs; and providing (403), to the UE (102), a reconfiguration instruction, in response to the received information on the reduced capability of the UE (102).

Embodiment 13

The method of embodiment 12, wherein the information on the full capability comprises information on one or more out of: a) a number of carriers supported by the UE (102); b) one or more carrier combinations supported by the UE (102); c) one or more processing capabilities of the UE (102); d) one or more features supported by the UE (102); e) a number of radio frontends that the UE (102) has; f) a bandwidth supported by the UE (102); g) a buffer or memory size supported by the UE (102); h) a number of PDN connections or PDU connections supported by the UE (102); i) one or more carrier aggregation related capabilities of the UE (102); and j) one or more dual connectivity related capabilities of the UE (102).

Embodiment 14

The method of embodiment 12 or 13, wherein the indication of the reduced capability is provided in an In-Device-Coexistence (IDC) assistance information.

Embodiment 15

The method of embodiment 14, wherein the indication of the reduced capability is provided in the IDC assistance information in combination with a multiple SIM, MUSIM, indication.

Embodiment 16

The method of embodiment 12 or 13, wherein the indication of the reduced capability comprises a multiple SIM, MUSIM, assistance information.

Embodiment 17

The method of any of the embodiments 12 to 16, wherein the wireless communications network and the at least one another network are different networks.

Embodiment 18

The method of any of the embodiments 12 to 16, wherein the wireless communications network and the at least one another network are the same network.

Embodiment 19

The method of embodiment 17 or 18, wherein the wireless communications network is a first Public Land Mobile Network, PLMN, or a non-public network (NPN), and wherein the at least one another network is a second PLMN or a second NPN.

Embodiment 20

The method of any of the embodiments 12 to 19, wherein the indication of the reduced capability comprises an indication of one or more carrier frequencies that are not to be used as compared to carrier frequencies in the full capacity.

Embodiment 21

The method of the embodiments 12 to 20, wherein the reconfiguration instruction is further provided to the UE (102) in response to an event.

Embodiment 22

A user equipment, UE, (102) having multiple Subscriber Identity Modules, SIMs, for simultaneous communication with two or more networks, the UE (102) being configured to:

provide, to a first network node associated with a first network associated with a first SIM, information on full capability of the UE (102), wherein the UE (102) is registered with the first network;

provide, to a second network node associated with a second network associated with a second SIM, the information on the full capability of the UE (102), wherein the UE (102) is registered with the second network such that the UE (102) is simultaneously registered with both the first network and the second network; split the full capability among the first and second SIMs into a first reduced capability and a second reduced capability;

provide an indication of the first reduced capability to the first network node; and/or provide an indication of the second reduced capability to the second network node.

Embodiment 23

The UE (102) of embodiment 22, wherein the information on the full capability comprises information on one or more out of: a) a number of carriers supported by the UE (102); b) one or more carrier combinations supported by the UE (102); c) one or more processing capabilities of the UE (102); d) one or more features supported by the UE (102); e) a number of radio frontends that the UE (102) has; f) a bandwidth supported by the UE (102); g) a buffer or memory size supported by the UE (102); h) a number of PDN connections or PDU connections supported by the UE (102); i) one or more carrier aggregation related capabilities of the UE (102); and j) one or more dual connectivity related capabilities of the UE (102).

Embodiment 24

The UE (102) of embodiment 22 or 23, wherein at least one of the indication of the first reduced capability and the indication of the second reduced capability is provided in an In-Device-Coexistence (IDC) assistance information.

Embodiment 25

The UE (102) of embodiment 23, wherein at least one of the indication of the first reduced capability and the indication of the second reduced capability is provided in the IDC assistance information in combination with a multiple SIM, MUSIM, indication.

Embodiment 26

The UE (102) of embodiment 22 or 23, wherein at least one of the indication of the first reduced capability and the indication of the second reduced capability comprises a multiple SIM, MUSIM, assistance information.

Embodiment 27

The UE (102) of any of the embodiments 22 to 26, wherein the first network and the second network are different networks.

Embodiment 28

The UE (102) of any of the embodiments 22 to 26, wherein the first network and the second network are the same network.

Embodiment 29

The UE (102) of embodiment 27 or 28, wherein the first network is a first Public Land Mobile Network, PLMN, or a first non-public network (NPN), and wherein the second network is a second PLMN or a second NPN.

Embodiment 30

The UE (102) of any of the embodiments 22 to 29, wherein the UE is configured to split the full capability among the first and second SIMs in response to an event.

Embodiment 31

The UE (102) of any of the embodiments 22 to 30, wherein at least one of the indication of the first reduced capability and the indication of the second reduced capability comprises an indication of one or more carrier frequencies that are not to be used as compared to carrier frequencies in the full capacity.

Embodiment 32

The UE (102) of any of the embodiments 22 to 31, the UE (102) further being configured to:
   receive a configuration instruction from at least one of the first and second network nodes, in response to at least one of the indication of the first reduced capability provided to the first network node and the indication of the second reduced capability provided to the second network node; and
   configure at least one radio resource control resource based on the received configuration instruction.

Embodiment 33

A network node (104, 106) associated with a wireless communications network, the network node being configured to:
   receive, from a user equipment, UE, (102), information on a full capability of the UE (102), wherein the UE (102) has at least two Subscriber Identity Modules, SIMs, and is simultaneously registered with the wireless communications network and at least one another network;
   receive, from the UE (102), an indication of a reduced capability of the UE (102) indicating a split of the full capability of the UE (102) among the at least two SIMs; and
   provide, to the UE (102), a reconfiguration instruction, in response to the received indication of the reduced capability of the UE (102).

Embodiment 34

The network node (104, 106) of embodiment 33, wherein the information on the full capability comprises information on one or more out of: a) a number of carriers supported by the UE (102); b) one or more carrier combinations supported by the UE (102); c) one or more processing capabilities of the UE (102); d) one or more features supported by the UE (102); e) a number of radio frontends that the UE (102) has; f) a bandwidth supported by the UE (102); g) a buffer or memory size supported by the UE (102); h) a number of PDN connections or PDU connections supported by the UE (102); i) one or more carrier aggregation related capabilities of the UE (102); and j) one or more dual connectivity related capabilities of the UE (102).

Embodiment 35

The network node (104, 106) of embodiment 33 or 34, wherein the indication of the reduced capability is provided in an In-Device-Coexistence, IDC, assistance information.

Embodiment 36

The network node (104, 106) of embodiment 35, wherein the indication of the reduced capability is provided in the IDC assistance information in combination with a multiple SIM, MUSIM, indication.

Embodiment 37

The network node (104, 106) of embodiment 33 or 34, wherein the indication of the reduced capability comprises a multiple SIM, MUSIM, assistance information.

Embodiment 38

The network node (104, 106) of any of the embodiments 33 to 37, wherein the wireless communications network and the at least one another network are different networks.

Embodiment 39

The network node (104, 106) of any of the embodiments 33 to 37, wherein the wireless communications network and the at least one another network are the same network.

Embodiment 40

The network node (104, 106) of embodiment 38 or 39, wherein the wireless communications network is a first Public Land Mobile Network, PLMN, or a non-public network (NPN), and the at least one another network is a second PLMN or a second NPN.

Embodiment 41

The network node (104, 106) of any of the embodiments 33 to 40, wherein the indication of the reduced capability comprises an indication of one or more carrier frequencies that are not to be used as compared to carrier frequencies in the full capacity.

Embodiment 42

The network node (104, 106) of any of the embodiments 33 to 41, wherein the reconfiguration instruction is further provided to the UE (102) in response to an event.

Figure 8:
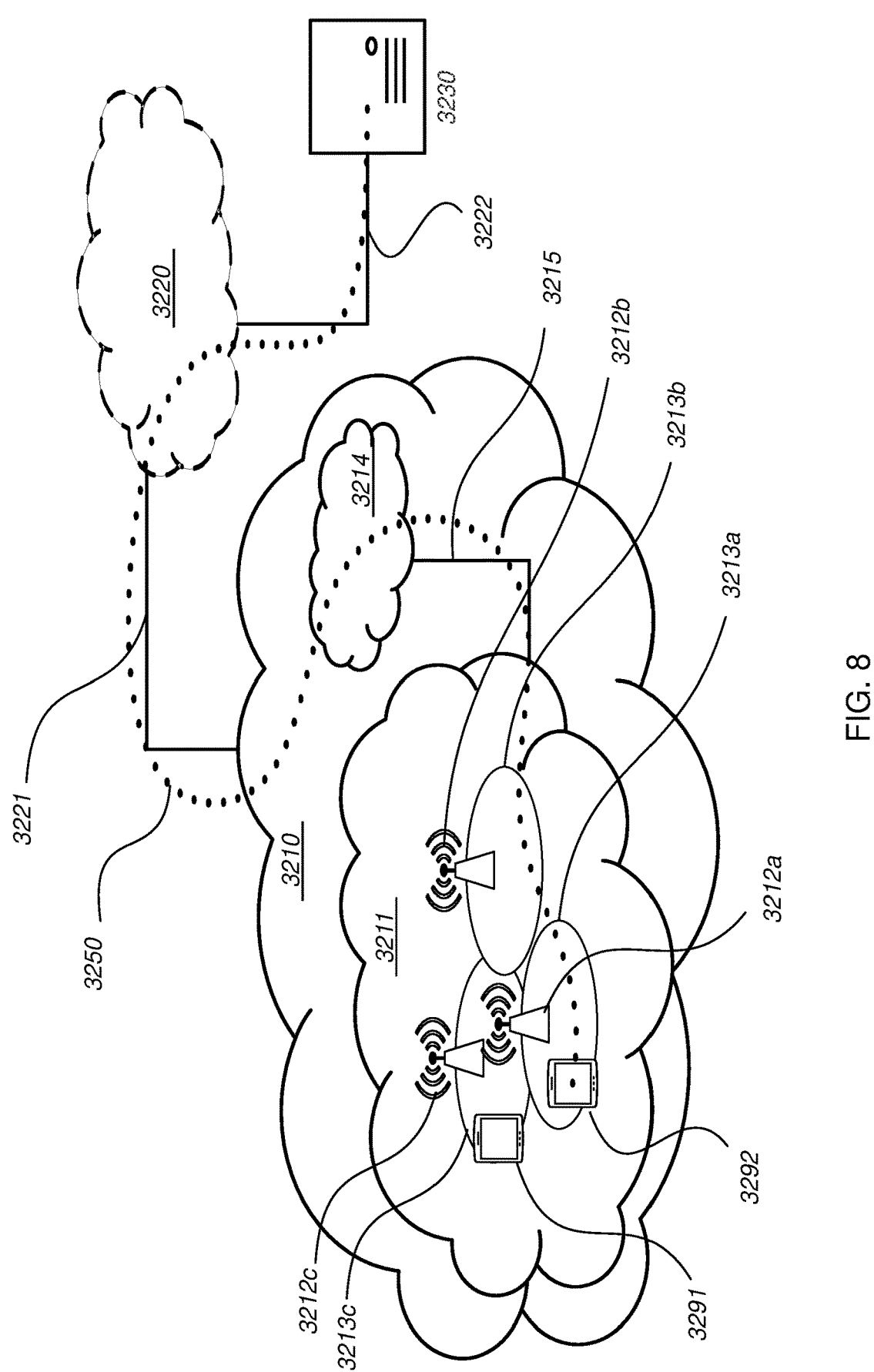
FIG. 8 illustrates a telecommunication network connected via an intermediate network to a host computer, in accordance with some embodiments.

FIG. 8 shows a telecommunication network connected via an intermediate network to a host computer in accordance with some embodiments. With reference to FIG. 8, in accordance with an embodiment, a communication system includes a telecommunication network 3210, such as a 3GPP-type cellular network, which comprises access network 3211, such as a radio access network, and core network

3214. Access network 3211 comprises a plurality of base stations 3212*a*, 3212*b*, 3212*c*, such as NBs, eNBs, gNBs or other types of wireless access points being examples of the first network node above, each defining a corresponding coverage area 3213*a*, 3213*b*, 3213*c*. Each base station 3212*a*, 3212*b*, 3212*c* is connectable to core network 3214 over a wired or wireless connection 3215. A first UE 3291 located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example being examples of the UE 102 above, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 8 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signalling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Figure 9:
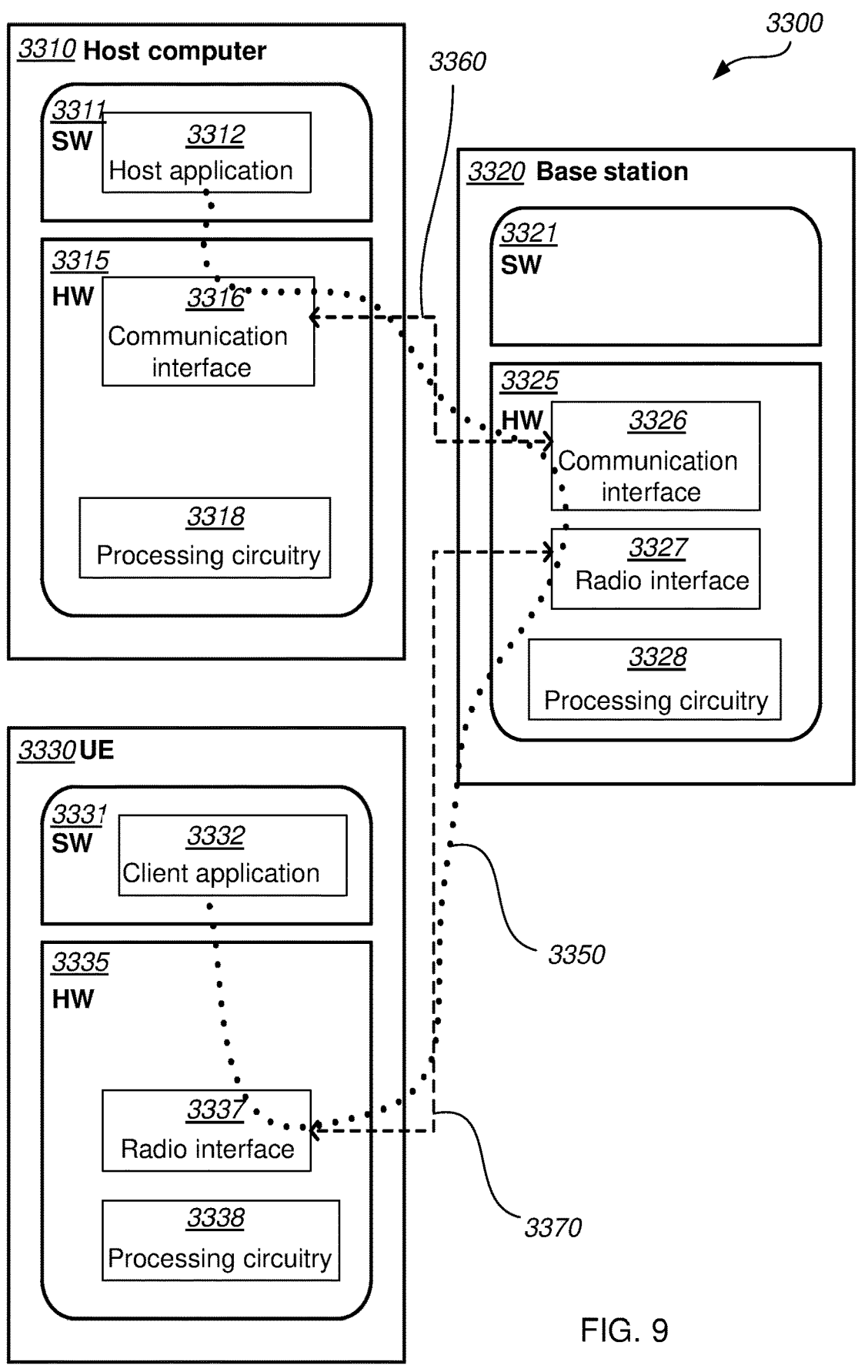
FIG. 9 illustrates a host computer communicating via a base station with a user equipment over a partially wireless connection, in accordance with some embodiments.

FIG. 9 shows a host computer communicating via a base station and with a user equipment over a partially wireless connection in accordance with some embodiments Example implementations, in accordance with an embodiment, of the UE, base station and host computer discussed in the preceding paragraphs will now be described with reference to FIG. 9. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 9) served by base station 3320. Communication interface 3326 may be configured to facilitate connection 3360 to host computer 3310. Connection 3360 may be direct or it may pass through a core network (not shown in FIG. 15) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. It's hardware 3333 may include radio interface 3337 configured to set up and maintain wireless connection 3370 with a base station serving a coverage area in which UE 3330 is currently located. Hardware 3333 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

It is noted that host computer 3310, base station 3320 and UE 3330 illustrated in FIG. 9 may be similar or identical to host computer 3230, one of base stations 3212*a*, 3212*b*, 3212*c* and one of UEs 3291, 3292 of FIG. 8, respectively. This is to say, the inner workings of these entities may be as shown in FIG. 9 and independently, the surrounding network topology may be that of FIG. 8.

In FIG. 9, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments make it possible efficiently handle UEs of multi SIM. Thereby the data communication, e.g. the handling or managing setup of communication may be performed in an efficient manner resulting in an improved battery lifetime and reduced response time.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3333 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signalling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors, etc.

Figures 10, 11:
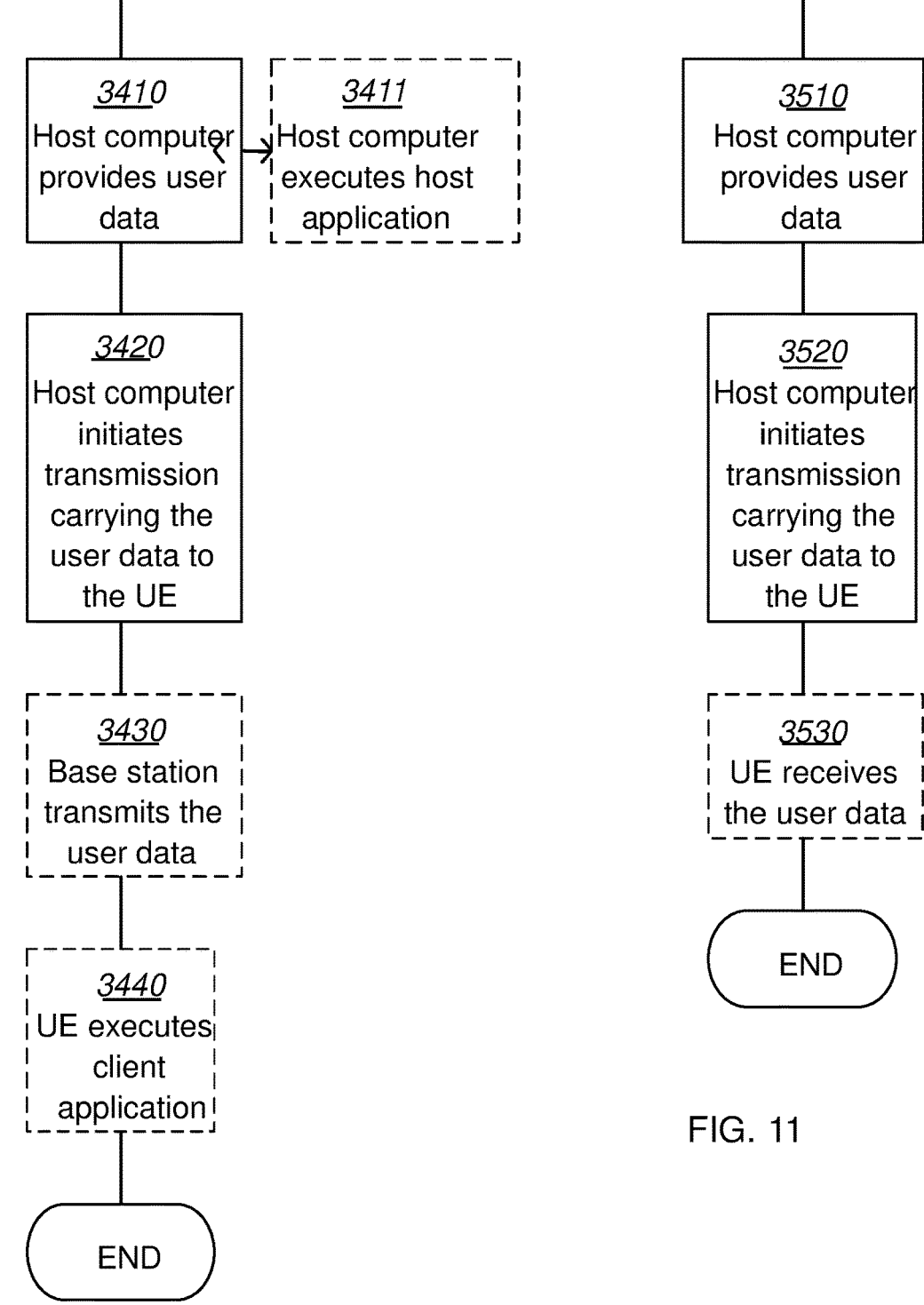
FIG. 10 is a flowchart illustrating methods implemented in a communication system including a host computer, a base station, and a user equipment, in accordance with some embodiments.
FIG. 11 is another flowchart illustrating methods implemented in a communication system including a host computer, a base station, and a user equipment, in accordance with some embodiments.

FIG. 10 shows methods implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIG. 8 and FIG. 9. For simplicity of the present disclosure, only drawing references to FIG. 10 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

FIG. 11 shows methods implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

Figures 12, 13:
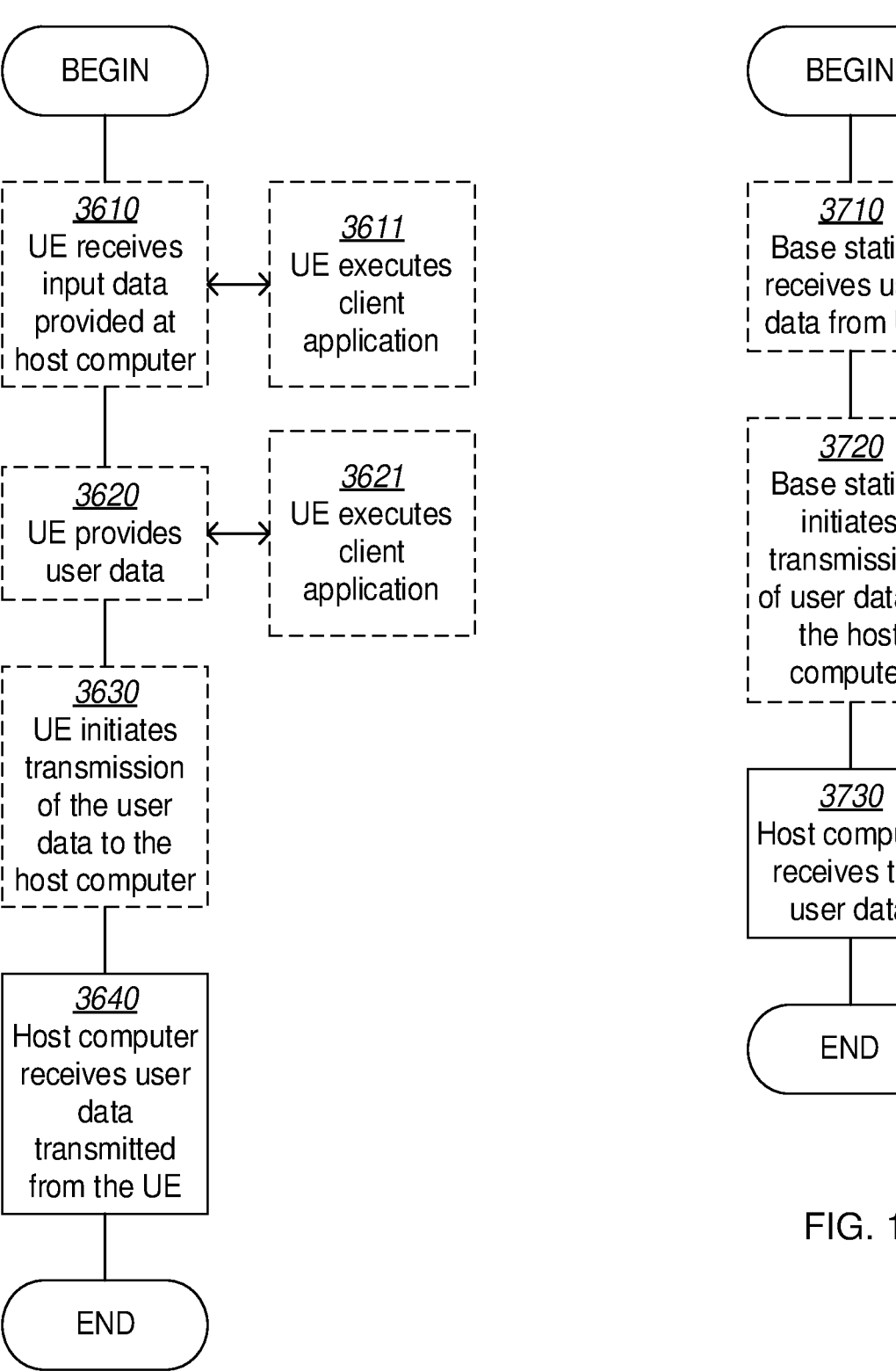
FIG. 12 is another flowchart illustrating methods implemented in a communication system including a host computer, a base station, and a user equipment, in accordance with some embodiments.
FIG. 13 is another flowchart illustrating methods implemented in a communication system including a host computer, a base station, and a user equipment, in accordance with some embodiments.

FIG. 12 shows methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

FIG. 13 shows methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIG. 8 and FIG. 9. For simplicity of the present disclosure, only drawing references to FIG. 13 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a user equipment (UE) having multiple Subscriber Identity Modules (SIM) for simultaneous communication with two or more wireless communications networks, the method comprising:

providing, to a first network node associated with a first wireless communications network associated with a first SIM, information on full capability of the UE, wherein the UE is registered with the first wireless communications network;

providing, to a second network node associated with a second wireless communications network associated with a second SIM, the information on the full capability of the UE, wherein the UE is registered with the second wireless communications network such that the UE is simultaneously registered with the first wireless communications network and the second wireless communications network;

splitting the full capability among the first and second SIMs into a first reduced capability and a second reduced capability; and providing a first indication of the first reduced capability to the first network node and/or providing a second indication of the second reduced capability to the second network node, wherein at least one of the first indication of the first reduced capability and/or the second indication of the second reduced capability is provided in an In-Device-Coexistence (IDC) assistance information in combination with a multiple SIM (MUSIM) indication, and wherein at least one of the first indication of the first reduced capability and the second indication of the second reduced capability comprises an indication of one or more carrier frequencies that are not to be used as compared to carrier frequencies in the full capacity.

2. The method of claim 1, wherein the information on the full capability comprises information on one or more out of: a) a number of carriers supported by the UE; b) one or more carrier combinations supported by the UE; c) one or more processing capabilities of the UE; d) one or more features supported by the UE; e) a number of radio frontends that the UE has; f) a bandwidth supported by the UE; g) a buffer or memory size supported by the UE; h) a number of packet data network (PDN) connections or protocol data unit (PDU) connections supported by the UE; i) one or more carrier aggregation related capabilities of the UE; and j) one or more dual connectivity related capabilities of the UE.

3. The method of claim 1, wherein at least one of the first indication of the first reduced capability and/or the second indication of the second reduced capability comprises a multiple SIM assistance information.

4. The method of claim 1, wherein the first wireless communications network and the second wireless communications network are different networks or a same network.

5. The method of claim 4, wherein the first wireless communications network is a first Public Land Mobile Network (PLMN) or a first non-public network (NPN), and wherein the second wireless communications network is a second PLMN or a second NPN.

6. The method of claim 1, wherein splitting of the full capability among the first and second SIMs is performed in response to an event.

7. The method of claim 1, further comprising:

receiving a configuration instruction from at least one of the first and second network nodes, in response to at least one of the first indication of the first reduced capability provided to the first network node and the second indication of the second reduced capability provided to the second network node; and configuring at least one radio resource control (RRC) resource based on the received configuration instruction.

8. A method performed by a first network node associated with a first wireless communications network, the method comprising:

receiving, from a user equipment (UE), information on a full capability of the UE, wherein the UE has at least two Subscriber Identity Modules (SIMs) and is simultaneously registered with the first wireless communications network and at least a second wireless communications network;

receiving, from the UE, a first indication of a first reduced capability of the UE indicating a split of the full capability of the UE among the at least two SIMs, wherein the first indication of the first reduced capability is provided in In-Device-Coexistence (IDC) assistance information in combination with a multiple SIM indication, and wherein the first indication of the first reduced capability comprises an indication of one or more carrier frequencies that are not to be used as compared to carrier frequencies in the full capacity; and providing, to the UE, a reconfiguration instruction, in response to the received first indication of the first reduced capability of the UE.

9. The method of claim 8, wherein the information on the full capability comprises information on one or more out of: a) a number of carriers supported by the UE; b) one or more carrier combinations supported by the UE; c) one or more processing capabilities of the UE; d) one or more features supported by the UE; e) a number of radio frontends that the UE has; f) a bandwidth supported by the UE; g) a buffer or memory size supported by the UE; h) a number of packet data network (PDN) connections or protocol data unit (PDU) connections supported by the UE; i) one or more carrier aggregation related capabilities of the UE; and j) one or more dual connectivity related capabilities of the UE.

10. The method of claim 8, wherein the first indication of the first reduced capability comprises a multiple SIM assistance information.

11. The method of claim 8, wherein the first wireless communications network and the second wireless communications network are different networks or a same network.

12. The method of claim 11, wherein the first wireless communications network is a first Public Land Mobile Network (PLMN) or a first non-public network (NPN), and wherein the second wireless communications network is a second PLMN or a second NPN.

13. The method of claim 8, wherein the reconfiguration instruction is further provided to the UE in response to an event.

14. A user equipment (UE) having multiple Subscriber Identity Modules (SIM) for simultaneous communication with two or more wireless communications networks, wherein the UE comprises:

processing circuitry configure to:

provide, to a first network node associated with a first wireless communications network associated with a first SIM, information on full capability of the UE, wherein the UE is registered with the first wireless communications network;

provide, to a second network node associated with a second wireless communications network associated with a second SIM, the information on the full capability of the UE, wherein the UE is registered with the second wireless communications network such that the UE is simultaneously registered with the first wireless communications network and the second wireless communications network;

split the full capability among the first and second SIMs into a first reduced capability and a second reduced capability; and provide a first indication of the first reduced capability to the first network node and/or provide a second indication of the second reduced capability to the second network node, wherein at least one of the first indication of the first reduced capability and/or the second indication of the second reduced capability is provided in an In-Device-Coexistence (IDC) assistance information in combination with a multiple SIM indication, and wherein at least one of the first indication of the first reduced capability and the second indication of the second reduced capability comprises an indication of one or more carrier frequencies that are not to be used as compared to carrier frequencies in the full capacity.

15. The UE of claim 14, wherein the information on the full capability comprises information on one or more out of: a) a number of carriers supported by the UE; b) one or more carrier combinations supported by the UE; c) one or more processing capabilities of the UE; d) one or more features supported by the UE; e) a number of radio frontends that the UE has; f) a bandwidth supported by the UE; g) a buffer or memory size supported by the UE; h) a number of packet data network (PDN) connections or protocol data unit (PDU) connections supported by the UE; i) one or more carrier aggregation related capabilities of the UE; and j) one or more dual connectivity related capabilities of the UE.

16. The UE of claim 14, wherein at least one of the first indication of the first reduced capability and/or the second indication of the second reduced capability comprises a multiple SIM assistance information.

17. The UE of claim 14, wherein the first wireless communications network and the second wireless communications network are different networks or a same network.

18. The UE of claim 17, wherein the first wireless communications network is a first Public Land Mobile Network (PLMN) or a first non-public network (NPN), and wherein the second wireless communications network is a second PLMN or a second NPN.

19. The UE of claim 14, wherein the processing circuitry is configured to split the full capability among the first and second SIMs in response to an event.

20. The UE of claim 14, wherein the processing circuitry is further configured to:

receive a configuration instruction from at least one of the first and second network nodes, in response to at least one of the first indication of the first reduced capability provided to the first network node and the second indication of the second reduced capability provided to the second network node; and configure at least one radio resource control (RRC) resource based on the received configuration instruction.

21. A first network node associated with a first wireless communications network, wherein the first network node comprises:

processing circuitry configured to:

receive, from a user equipment (UE), information on a full capability of the UE, wherein the UE has at least two Subscriber Identity Modules (SIMs) and is simultaneously registered with the first wireless communications network and at least a second wireless communications network;

receive, from the UE, a first indication of a first reduced capability of the UE indicating a split of the full capability of the UE among the at least two SIMs, wherein the first indication of the first reduced capability is provided in an In-Device-Coexistence (IDC) assistance information in combination with a multiple SIM indication, and wherein the first indication of the first reduced capability comprises an indication of one or more carrier frequencies that are not to be used as compared to carrier frequencies in the full capacity; and provide, to the UE, a reconfiguration instruction, in response to the received first indication of the first reduced capability of the UE.

22. The first network node of claim 21, wherein the information on the full capability comprises information on one or more out of: a) a number of carriers supported by the UE; b) one or more carrier combinations supported by the UE; c) one or more processing capabilities of the UE; d) one or more features supported by the UE; e) a number of radio frontends that the UE has; f) a bandwidth supported by the UE; g) a buffer or memory size supported by the UE; h) a number of packet data network (PDN) connections or protocol data unit (PDU) connections supported by the UE; i) one or more carrier aggregation related capabilities of the UE; and j) one or more dual connectivity related capabilities of the UE.

23. The first network node of claim 21, wherein the first indication of the first reduced capability comprises a multiple SIM assistance information.

24. The first network node of claim 21, wherein the first wireless communications network and the second wireless communications network are different networks or a same network.

25. The first network node of claim 24, wherein the first wireless communications network is a first Public Land Mobile Network (PLMN) or a first non-public network (NPN), and wherein the second wireless communications network is a second PLMN or a second NPN.

26. The first network node of claim 21, wherein the reconfiguration instruction is further provided to the UE in response to an event.

* * * * *